(12) United States Patent
Yamagishi et al.

(10) Patent No.: US 11,336,957 B2
(45) Date of Patent: May 17, 2022

(54) RECEPTION APPARATUS, TRANSMISSION APPARATUS, AND DATA PROCESSING METHOD

(71) Applicant: Saturn Licensing LLC, New York, NY (US)

(72) Inventors: Yasuaki Yamagishi, Kanagawa (JP); Tatsuya Igarashi, Tokyo (JP); Yoshiharu Dewa, Tokyo (JP)

(73) Assignee: SATURN LICENSING, LLC, New York, NY (US)

( * ) Notice: Subject to any disclaimer, the term of this patent is extended or adjusted under 35 U.S.C. 154(b) by 0 days.

(21) Appl. No.: 16/076,189

(22) PCT Filed: Feb. 1, 2017

(86) PCT No.: PCT/JP2017/003531
§ 371 (c)(1),
(2) Date: Aug. 7, 2018

(87) PCT Pub. No.: WO2017/141701
PCT Pub. Date: Aug. 24, 2017

(65) Prior Publication Data
US 2020/0053427 A1 Feb. 13, 2020

(30) Foreign Application Priority Data
Feb. 15, 2016 (JP) .............................. JP2016-026420

(51) Int. Cl.
*H04N 7/173* (2011.01)
*H04N 21/458* (2011.01)
(Continued)

(52) U.S. Cl.
CPC ......... *H04N 21/458* (2013.01); *H04N 21/235* (2013.01); *H04N 21/262* (2013.01);
(Continued)

(58) Field of Classification Search
CPC ........... H04N 21/2401; H04N 21/2393; H04N 21/4383; H04N 21/235
(Continued)

(56) References Cited

U.S. PATENT DOCUMENTS

2012/0259994 A1* 10/2012 Gillies ................ H04L 12/1881
709/231
2013/0007223 A1* 1/2013 Luby ..................... H04L 65/604
709/219
(Continued)

FOREIGN PATENT DOCUMENTS

| JP | 2000-31921 A | 1/2000 |
| JP | 2015-180065 A | 10/2015 |
| JP | 2015-529988 A | 10/2015 |

OTHER PUBLICATIONS

International Search Report dated Apr. 25, 2017 in PCT/JP2017/003531, 2 pages

*Primary Examiner* — Jivka A Rabovianski
(74) *Attorney, Agent, or Firm* — Chris Kolefas

(57) ABSTRACT

The present technique relates to a reception apparatus, a transmission apparatus, and a data processing method that enable to execute a process according to delivery of resource files of an application associated with content. The reception apparatus receives content, acquires resource delivery information regarding delivery of one or a plurality of resource files that are part of an application associated with the content, the resource delivery information transmitted along with the content, and executes a process according to the delivery of the resource files on a basis of the acquired resource delivery information. The present technique can be applied to, for example, a television receiver that can receive digital broadcasting.

20 Claims, 32 Drawing Sheets

(51) Int. Cl.
  *H04N 21/235* (2011.01)
  *H04N 21/262* (2011.01)
  *H04N 21/435* (2011.01)
  *H04N 21/643* (2011.01)
  *H04N 21/858* (2011.01)

(52) U.S. Cl.
  CPC ......... *H04N 21/435* (2013.01); *H04N 21/643* (2013.01); *H04N 21/8586* (2013.01)

(58) Field of Classification Search
  USPC ....................................................... 725/116
  See application file for complete search history.

(56) References Cited

U.S. PATENT DOCUMENTS

| | | | |
|---|---|---|---|
| 2013/0347030 A1 | 12/2013 | Oh et al. | |
| 2016/0164943 A1* | 6/2016 | Walker | H04L 67/42 709/219 |
| 2016/0205158 A1* | 7/2016 | Lo | H04L 65/00 709/219 |

* cited by examiner

FIG. 7

```
PackageFileURL:"PackageFile-url")

Content-Type: Multipart/related;
boundary="boundary-content_example";
type=application/mbms-envelope+xml
--boundary-content_example
Content-Type:"application/mbms-envelope+xml"
<metadataEnvelope ... >
  <item metadataURI ="File url of AppManifest" version="AppManifest-version" contentType="application/w3c-manifest+json"/>
  <item metadataURI ="File url of StartUpPage" version="StartUpPage-version" contentType="text/html"/>
</metadataEnvelope>
--boundary-content_example
Content-Location:"File url of AppManifest"

[AppManifest]

--boundary-content_example
Content-Location:"File url of StartUpPage"

[StartUpPage]

--boundary-content_example--
```

FIG. 8

EXAMPLE OF FORMAT OF W3C Web AppManifest

```
{
  "start_url":"StartUpPage-url",
}
```

FIG. 9

```
PackageFile(FileURL:"PackageFile-url")

...
  <metadataEnvelope...>
    ...
    <item metadataURI="File url of AppManifest" version="AppManifest-version" contentType="application/atsc-manifest+json"/>
    ...
  </metadataEnvelope>
  ...
```

FIG. 10

EXAMPLE OF FORMAT OF EXTENDED Web AppManifest

```
{
"start_url":"StartUpPage-url",
"resources":[
  {
  "url":"(FILE URL: REQUIRED)",
  "sizes":"(SIZE IN BYTES: OPTIONAL)",
  "absoluteDeliveryTimeStart":"(DELIVERY START TIME IN ABSOLUTE TIME (:OPTIONAL))",
  "absoluteDeliveryTimeEnd":"(DELIVERY END TIME IN ABSOLUTE TIME (:OPTIONAL))",
  "relativeDeliveryTimeStart":"(DELIVERY START TIME IN RELATIVE TIME FROM TOP OF PROGRAM LIKE Normal Play Time (:OPTIONAL)",
  "relativeDeliveryTimeEnd":"(DELIVERY END TIME IN RELATIVE TIME FROM TOP OF PROGRAM LIKE Normal Play Time (:OPTIONAL))"
  },
  {
  ...
  },
  ...
](THIS resource MEMBER IS OPTIONAL)
}
```

FIG. 11

EXAMPLE OF DESCRIPTION OF EXTENDED WebAppManifest

```
[
"start_url":"StartUpPage-url",
"resources":[
  {
    "url":"ResourceFile-10-url",
    "sizes":"123",
    "relativeDeliveryTimeStart":"T00:10:22.123456",
    "relativeDeliveryTimeEnd":"T00:12:33.654321"
  },
  {
    "url":"ResourceFile-11-url",
    "sizes":"4567",
    "relativeDeliveryTimeStart":"T00:13:44.345678",
    "relativeDeliveryTimeEnd":"T00:16:55.654321"
  },
]
]
```

FIG.27

| Element or Attribute Name | Use | Description |
|---|---|---|
| bundleDescription | | Root element of the User Service Bundle Description. |
| userServiceDescription | | A single instance of an ATSC 3.0 Service. |
| @serviceId | M | Globally unique identifier of the ATSC 3.0 Service. |
| @atsc:serviceId | M | Reference to corresponding service entry in LLS(FIT). The value of this attribute is the same value of serviceId assigned to the entry. |
| @atsc:fullMPDUri | M | Reference to an MPD fragment which contains descriptions for contents components of the ATSC 3.0 Service delivered over broadcast and optionally, also over broadband. |
| A ← --- @atsc:sTSIDUri | M | Reference to the S-TSID fragment which provides access related parameters to the Transport sessions carrying contents of this ATSC 3.0 Service |
| name | 0...N | Name of the ATSC 3.0 service as given by the lang attribute. |
| lang | OM | Language of the ATSC 3.0 service name. The language shall be specified according to XML datatypes(XML Schema Part 2[7]). |
| serviceLanguage | 0...N | Available languages of the ATSC 3.0 service. The language shall be specified according to XML datatypes(XML Schema Part 2[7]). |
| atsc:capabilityCode | 0...1 | Specifies the capabilities and capability groups, as defined in the ATSC 3.0 Service Announcement & Personalization standard [9], required in the receiver to be able to create a meaningful presentation of the content of this ATSC service. The format of this element shall be identical to the atsc:capabilities element specified under the Content fragment of the ATSC 3.0 Service Announcement & Personalization spec [9]. |
| deliveryMethod | 1...N | Container of transport related information pertaining to the contents of the service over broadcast and (optionally) broadband modes of access |
| atsc:broadcastAppService | 1...N | A DASH Representation delivered over broadcast, in multiplexed or non-multiplexed form, containing the corresponding media component(s) belonging to the ATSC 3.0 Service, across all Periods of the affiliated Media Presentation |
| basePattern | 1...N | A character pattern for use by the ATSC receiver to match against any portion of the Segment URL used by the DASH client to request Media Segments of a parent Representation under its containing Period. A match implies that the corresponding requested Media Segment is carried over broadcast transport. |
| atsc:unicastAppService | 0...N | A DASH Representation delivered over broadband, in multiplexed or non-multiplexed form, containing the constituent media content component(s) belonging to the ATSC 3.0 Service, across all Periods of the affiliated Media Presentation |
| basePattern | 1...N | A character pattern for use by the ATSC receiver to match against any portion of the Segment URL used by the DASH client to request Media Segments of a parent Representation under its containing Period. A match implies that the corresponding requested Media Segment is carried over broadband transport. |

FIG.28

| Element or Attribute Name | | | Use | Description |
|---|---|---|---|---|
| S-TSID | | | | Service Transport Session Instance Description |
| | RS | | 1..N | ROUTE session |
| | | @bsid | OD | Identifier of the Broadcast Stream within which the content component(s) of the broadcastAppService are carried. When this attribute is absent, the default Broadcast Stream is the one whose PLPs carry SLS fragments for this ATSC 3.0 service. Its value shall be identical to that of the broadcast_stream_id in the FIT. |
| | | @sIpAddr | OD | Source IP address (default:current ROUTE session's source IP address) (M for non-primary session) |
| | | @dIpAddr | OD | Destination IP address (default:current ROUTE session's destination IP address) (M for non-primary session) |
| | | @dport | OD | Destination port (default:current ROUTE session's destination port) (M for non-primary session) |
| | | @PLPID | OD | Physical Layer Pipe ID for ROUTE session (default:current physical layer pipe) |
| | LS | | 1..N | LCT channel |
| | | @tsi | M | TSI value |
| | | @PLPID | OD | PLP ID(overrides default ROUTE session value) |
| | | @bw | O | Maximum bandwidth |
| | | @startTime | O | Start time |
| | | @endTime | O | End time |
| | SrcFlow | | 0..1 | Source Flow as defined by the in ATSC 3.0 Delivery & Synchronization spec[3] |
| | RepairFlow | | 0..1 | Repair Flow as defined by the in ATSC 3.0 Delivery & Synchronization spec[3][3] |

A → S-TSID
B → SrcFlow

FIG. 29

| Element or Attribute Name | Use | Description |
|---|---|---|
| SrcFlow | | Source flow carried in the LCT session. |
| @rt | OD default: false | If not present it is false. Shall be present and set to "true" when the SrcFlow carries streaming media. |
| @minbuffersize | O | Defines the minimum number of Kilobytes required in the receiver transport buffer for the LCT session. This value may be present if @rt is set to true. |
| EFDT | 0..1 | The extended FDT instance. See further description in Section A.3.3.2.3. |
| ContentInfo | 0..1 | May provide additional information that can be mapped to the application service that is carried in this transport session, e.g. Representation ID of a DASH [2] content or the Application Set parameters of a DASH [2] Media Representation in order to select the LCT transport session for rendering. |
| Payload | 1..N | Information on the payload of ROUTE packets carrying the objects of the source flow. |
| @codePoint | OD default=0 | Value of the CP (Codepoint) field in the LCT header. |
| @formatID | M | Specifies the payload format of the delivery object. For details see Table A.3.2. |
| @frag | OD default=0 | 0:arbitrary 1:application specific(sample based) 2:application specific(e.g. a collection of boxes) |
| @order | OD default=0 | 0:arbitrary 1:in-order delivery 2:in-order delivery of media samples and prior to movie fragment box |
| @srcFecPayloadID | OD default=1 | Defined values of the Source FEC payload ID for use in conjunction with the following rules:<br>• 0:the source FEC payload ID is absent and the entire delivery object is contained in this packet. The FECParams child element of SrcFlow shall be absent.<br>• 1:the source FEC payload ID is a 32-bit unsigned integer value that expresses the start offset in the object. Start offset is defined in Section A.3.5 The FECParams child element of SrcFlow shall be absent.<br>• 2:the FECParams child element of SrcFlow defines the Format of the Source FEC Payload ID |
| FECParams | 0..1 | Defines the parameters of the FEC scheme associated with the source flow, in the from of FEC Object Transmission Information as defined in RFC 5052 [12]<br><br>The FEC parameters are applied to the Source FEC Payload ID value specified in the ROUTE (ALC) packet header. |

FIG.30

| Element or Attribute Name | Use | Data Type | Description |
|---|---|---|---|
| C ← EFDT | | | If provided, it specifies the details of the file delivery data in the form of the Extended FDT instance which includes nominal FDT instance parameters.<br><br>The EFDT may either be embedded or may be provided as a reference. If provided as a reference the EFDT may be updated independently of the signaling metadata.<br><br>If referenced, and delivered as an in-band object of the included source flow which is delivered on an LCT channel separate from the LCT channel carrying the signaling metadata, its TOI value shall be "0".<br><br>If the referenced EFDT is delivered on a different LCT channel from the LCT channel carrying the contents of the reference srcFlow, its TOI value shall be "1". |
| @tsi | 0..1 | unsignedInt | TSI of the LCT channel carrying the referenced EFDT. |
| @idRef | 0..1 | anyURI | Identification of the EFDT in the form of a URI when the EFDT is delivered in-band with the source flow as a referenced delivery object. Identical to the Content-Location for the FDT |
| @version | 0..1 | unsignedInt | Version of this Extended FDT instance descriptor. The version if increased by one when the descriptor is updated. The received EFDT with highest version number in the currently valid version. |
| @maxExpiresDelta | 0..1 | unsignedInt | Time interval in number of integer seconds, which when added to the wall-clock time at the receiver when it acquires the first ROUTE packet carrying the object described by this EFDT, shall represent the expiration time of the associated EFDT. If @maxExpiresDelta is not present, the expiration time of the EFDT shall be given by the sum of a) the value of the ERT field in the EXT_TIME header of the ROUTE packet and b) the current receiver time when parsing the packet header. See Section A.3.3.2.3.2 on additional rules for deriving the EFDT expiration time. |
| @maxTransportSize | 0..1 | unsignedInt | The maximum transport size of any object described by this EFDT. Shall be present if not present in FEC_OTI. |
| @FileTemplate | 0..1 | string | Specifies the file URL (equivalent to the Content-Location attribute of the FDT) or a template format for the derivation of the file URL. For details refer to Section A.3.3.2.3.2 |
| @FDTParameters | 0..1 | fdt:FDT-InstanceType | Any parameters allowed in the FLUTE FDT instance from RFC 6726[23]. |

RECEPTION APPARATUS, TRANSMISSION APPARATUS, AND DATA PROCESSING METHOD

TECHNICAL FIELD

The present technique relates to a reception apparatus, a transmission apparatus, and a data processing method, and particularly, to a reception apparatus, a transmission apparatus, and a data processing method that can execute a process according to delivery of resource files of an application associated with content.

BACKGROUND ART

It is known that application control information, such as an AIT (Application information Table), is used for delivery life cycle control of an application associated with content of a program, a commercial, or the like (hereinafter, also simply referred to as application) (for example, see PTL 1). The application control information allows a receiver to control operation of starting and ending the application.

CITATION LIST

Patent Literature

[PTL 1]
JP 2015-180065A

SUMMARY

Technical Problem

Incidentally, a proposal is requested to simplify the delivery life cycle control of the application while allowing the receiver side to execute a process according to delivery of resource files of the application associated with the content.

The present technique has been made in view of the circumstances, and the present technique enables to execute a process according to delivery of resource files of an application associated with content.

Solution to Problem

A reception apparatus according to a first aspect of the present technique is a reception apparatus including: a reception unit configured to receive content; an acquisition unit configured to acquire resource delivery information regarding delivery of one or a plurality of resource files that are part of an application associated with the content, the resource delivery information transmitted along with the content; and a processing unit configured to execute a process according to the delivery of the resource files on the basis of the acquired resource delivery information.

The reception apparatus according to the first aspect of the present technique may be an independent apparatus or may be an internal block configuring one apparatus. In addition, a data processing method according to the first aspect of the present technique is a data processing method corresponding to the reception apparatus according to the first aspect of the present technique.

In the reception apparatus and the data processing method according to the first aspect of the present technique, the content is received. The resource delivery information regarding the delivery of one or a plurality of resource files that are part of the application associated with the content, the resource delivery information transmitted along with the content, is acquired. The process according to the delivery of the resource files is executed on the basis of the acquired resource delivery information.

A transmission apparatus according to a second aspect of the present technique is a transmission apparatus including: a generation unit configured to generate resource delivery information regarding delivery of one or a plurality of resource files that are part of an application associated with content; and a transmission unit configured to transmit the resource delivery information along with the content.

The transmission apparatus according to the second aspect of the present technique may be an independent apparatus or may be an internal block configuring one apparatus. In addition, a data processing method according to the second aspect of the present technique is a data processing method corresponding to the transmission apparatus according to the second aspect of the present technique.

In the transmission apparatus and the data processing method according to the second aspect of the present technique, the resource delivery information regarding the delivery of one or a plurality of resource files that are part of the application associated with the content is generated, and the resource delivery information is transmitted along with the content.

Advantageous Effect of Invention

According to the first aspect and the second aspect of the present technique, a process according to delivery of resource files of an application associated with content can be executed.

Note that the advantageous effect described here may not be limited, and the advantageous effect may be any of the advantageous effects described in the present disclosure.

BRIEF DESCRIPTION OF DRAWINGS

FIG. 7 depicts an example of a structure of a startup package file.

FIG. 8 depicts an example of a format of Web App Manifest of W3C.

FIG. 9 depicts an example of description of the startup package file in a case of using extended Web App Manifest.

FIG. 10 depicts an example of a format of the extended Web App Manifest.

FIG. 11 depicts an example of description of the extended Web App Manifest.

FIG. 27 depicts an example of a format of USD metadata.

FIG. 28 depicts an example of a format of S-TSID metadata.

FIG. 29 depicts an example of a format of an SrcFlow element.

FIG. 30 depicts an example of a format of an EFDT element.

DESCRIPTION OF EMBODIMENT

Hereinafter, an embodiment of the present technique will be described with reference to the drawings. Note that the embodiment will be described in the following order.
1. Configuration of System
2. Outline of the Present Technique
3. Specific Example of Operation
(A) Broadcast Mode
(B) Hybrid Mode
(C) Communication Mode
4. Examples of Signaling
5. Modifications
6. Configuration of Computer

1. Configuration of System (Configuration of Transmission System)

Figure 1:
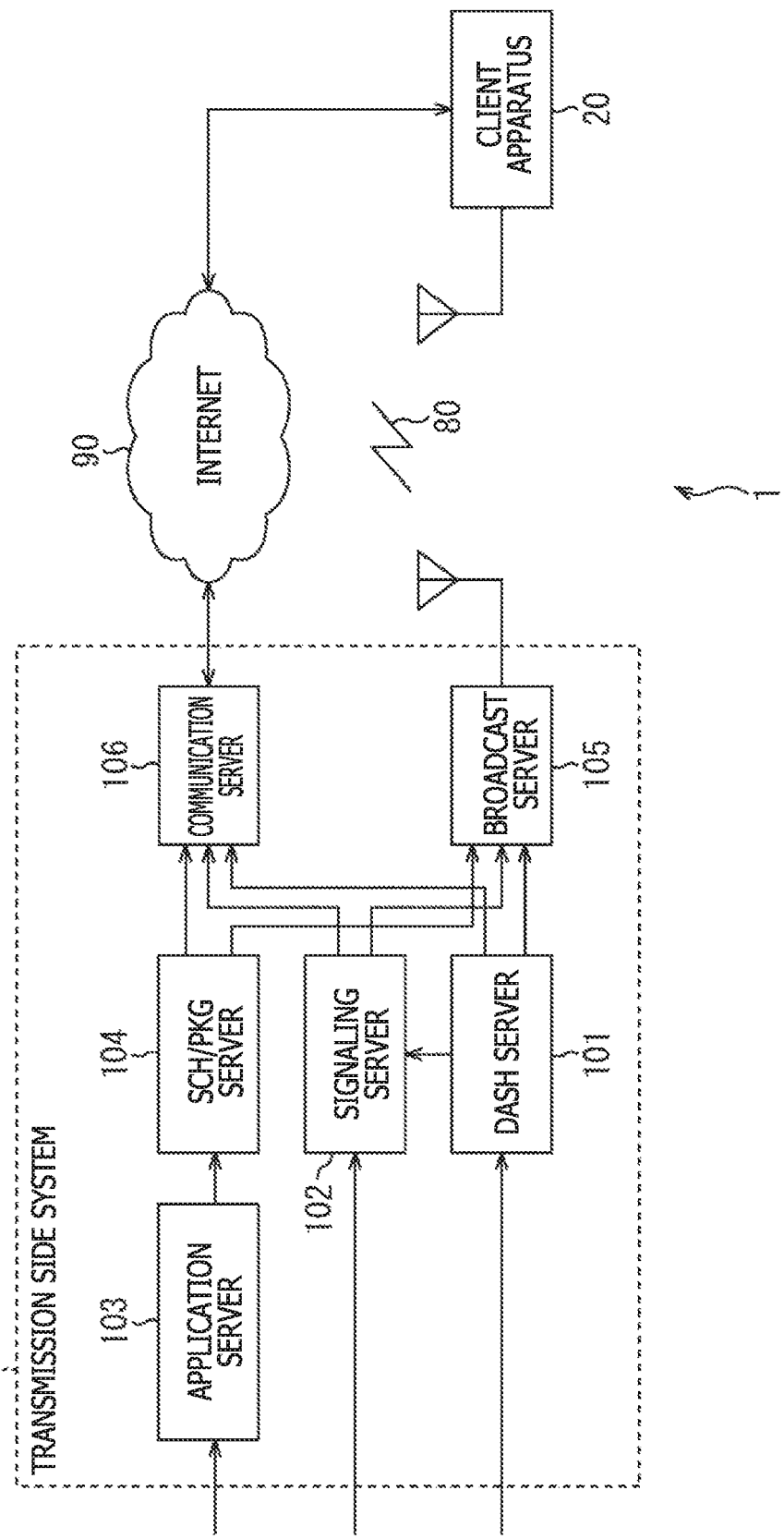
FIG. 1 depicts a configuration example of an embodiment of a transmission system according to the present technique.

FIG. 1 depicts a configuration example of an embodiment of a transmission system according to the present technique. Note that the system denotes a logical set of a plurality of apparatuses.

In FIG. 1, a transmission system 1 includes a transmission side system 10 and a client apparatus 20 on a reception side. In the transmission system 1, the client apparatus 20 receives data transmitted from the transmission side system 10 through a transmission path 80 as a broadcast network or through Internet 90 as a communication network.

For example, data transmission in compliance with a predetermined standard, such as ATSC (Advanced Television Systems Committee) 3.0 that is a next-generation broadcast standard of the U.S.A. currently being formulated, is performed in the transmission system 1.

Note that it is expected that the transmission system implemented in the ATSC 3.0 is an IP transmission system, in which IP (Internet Protocol) packets used in the field of communication are used in digital broadcasting, instead of a currently widely used MPEG-2 TS (Transport Stream) system. In this way, the ATSC 3.0 is expected to provide more advanced services.

The transmission side system 10 executes a process for transmitting data in compliance with a predetermined standard such as ATSC 3.0. The transmission side system 10 includes a DASH server 101, a signaling server 102, an application server 103, an SCH/PKG server 104, a broadcast server 105, and a communication server 106.

The DASH server 101 is a server for performing a delivery service corresponding to MPEG-DASH (Dynamic Adaptive Streaming over HTTP). Here, the MPEG-DASH is a streaming delivery standard in accordance with OTT-V (Over The Top Video) and is a standard related to adaptive streaming delivery using a streaming protocol based on HTTP (Hypertext Transfer Protocol).

The standard of MPEG-DASH defines a manifest file for describing metadata that is management information of a file of a video or sound and defines a file format for transmitting content of a video. Note that the former manifest file is called MPD (Media Presentation Description). In addition, the latter file format is also called a segment format.

The DASH server 101 receives data for generating MPD metadata, data of content, and the like from the outside. The DASH server 101 generates MPD metadata on the basis of the data from the outside and transmits the MPD metadata to the signaling server 102. The DASH server 101 also generates a file of a segment (DASH segment) of content, such as a program and a commercial, on the basis of the data from the outside and transmits the file to the broadcast server 105 or the communication server 106.

The signaling server 102 receives data for generating signaling from the outside. The signaling server 102 also receives the MPD metadata from the DASH server 101. The signaling server 102 generates signaling on the basis of the data from the outside, the MPD metadata, or the like and transmits the signaling to the broadcast server 105 or the communication server 106.

Here, examples of the signaling expected to be used in the ATSC 3.0 include LLS (Link Layer Signaling) signaling and SLS (Service Layer Signaling) signaling. The LLS signaling is signaling acquired before the SLS signaling, and the SLS signaling is acquired according to the information included in the LLS signaling. The SLS signaling is service-based signaling.

The LLS signaling includes metadata of an SLT (Service List Table) and the like. The SLT metadata includes basic information indicating the configuration of a stream or a service in a broadcast network, such as information (selection information) necessary for selecting a service.

The SLS signaling includes metadata, such as USD (User Service Description), S-TSID (Service-based Transport Session Instance Description), and MPD (Media Presentation Description). The USD metadata includes information of acquisition locations and the like of other metadata. Note that the USD is called USBD (User Service Bundle Description) in some cases.

The S-TSID metadata is metadata extending LSID (LCT Session Instance Description) for the ATSC 3.0 and is control information of a ROUTE (Real-time Object Delivery over Unidirectional Transport) protocol. Note that ROUTE is a protocol for transferring a streaming file and is an extension of FLUTE (File Delivery over Unidirectional Transport). In addition, the S-TSID metadata can specify an EFDT (extended FDT) transmitted in a ROUTE session. The EFDT is an extension of an FDT (File Delivery Table) implemented in the FLUTE and is control information for transfer.

The MPD metadata is, as described above, management information of a file of a video or sound delivered by streaming. Note that the metadata, such as SLT, USD, S-TSID, and MPD, can be described by, for example, a markup language such as XML (Extensible Markup Language).

The signaling server 102 generates LLS signaling including SLT metadata and SLS signaling including USD metadata, S-TSID metadata, and MPD metadata. Note that the signaling server 102 processes the MPD metadata generated by the DASH server 101 as SLS signaling.

The application server 103 receives data for generating a file configuring an application from the outside. The application server 103 generates a startup page file (for example, HTML document file or the like) and one or a plurality of resource files (for example, image file, script file, and the like) configuring the application on the basis of the data from the outside and transmits the files to the SCH/PKG server 104.

Note that the application is an application associated with content of a program, a commercial, or the like. In addition, an example of the application that can be used includes an application developed by a script language, such as a markup language like HTML5 (HyperText Markup Language 5) and JavaScript (registered trademark).

The SCH/PKG server 104 determines a delivery schedule of the file (resource file) configuring the application and provides the delivery schedule in an application manifest file. The SCH/PKG server 104 further generates a startup package file including the application manifest file, a startup page file, and the resource file and transmits the startup package file to the broadcast server 105.

Note that the details of the startup package file and the application manifest file will be described later. In addition, the startup package file may not include the startup page file and the resource files. In addition, the startup page file and the resource files are transmitted to the communication server 106 in a case of delivery through communication.

The SCH/PKG server 104 also generates an EFDT including transfer control information according to the delivery schedule of the files (resource files configuring the application and transmits the EFDT to the broadcast server 105. Note that the transfer control information is information regarding a specific resource file with a delivery schedule that may be changed according to the time zone, and the details will be described later.

The SCH/PKG server 104 further transmits an additional resource file that is a resource file referenced later by the startup page file to the broadcast server 105 or the communication server 106.

The broadcast server 105 is a transmitter that can perform data transmission in compliance with a standard of digital broadcasting such as ATSC 3.0.

The broadcast server 105 receives the DASH segment transmitted from the DASH server 101, the signaling transmitted from the signaling server 102, and the file (for example, startup package file or the like) related to the application transmitted from the SCH/PKG server 104. The broadcast server 105 processes the DASH segment, the signaling, and the file related to the application and transmits (simultaneously broadcasts) them through the transmission path 80.

The communication server 106 is a server that provides various types of data through the Internet 90 in response to a request from the client apparatus 20 connected to the Internet 90.

The communication server 106 receives the DASH segment transmitted from the DASH server 101, the signaling transmitted from the signaling server 102, and the file (for example, additional resource file or the like) related to the application transmitted from the SCH/PKG server 104. The communication server 106 processes the DASH segment, the signaling, and the file related to the application. In addition, the communication server 106 transmits various files through the Internet 90 in response to a request from the client apparatus 20.

The client apparatus 20 is a receiver that can receive transmission data in compliance with a predetermined standard such as ATSC 3.0. For example, the client apparatus 20 is a fixed receiver, such as a television receiver and a set-top box, or a mobile receiver, such as a smartphone, a cell phone, and a tablet computer. The client apparatus 20 may also be, for example, a device mounted on a car such as an on-board television. Note that the detailed configuration of the client apparatus 20 will be described later with reference to FIG. 2.

The client apparatus 20 receives and processes the files of the DASH segment, the signaling, and the like transmitted (simultaneously broadcasted) from the broadcast server 105 through the transmission path 80 to output a video and sound of content of a broadcast program or the like.

In addition, in a case where the client apparatus 20 has a communication function, the client apparatus 20 can access the communication server 106 through the Internet 90 and acquire various files. For example, the client apparatus 20 receives and processes the files of the DASH segment, the MPD metadata, and the like transmitted (adaptively delivered by streaming) from the communication server 106 through the Internet 90 and outputs a video and sound of the content of a VOD (Video On Demand) program or the like.

The client apparatus 20 also receives and processes the files related to the application transmitted from the broadcast server 105 or the communication server 106 to execute the application. That is, the client apparatus 20 executes the application acquired through broadcast or through communication in association with the content acquired through broadcast or through communication. However, the application is hidden and operated (in the background) in some cases (started without being recognized by the user) instead of explicit display of some information.

The client apparatus 20 can further execute a process according to the delivery of the resource files of the application on the basis of the delivery schedule information included in the application manifest file of the startup package file or on the basis of the transfer control information included in the EFDT. Note that the details of the delivery schedule information and the transfer control information will be described later with reference to FIGS. 7 to 13 and the like.

Note that in the transmission system 1, the transmission path 80 may be a ground wave (terrestrial broadcasting) or more may, for example, satellite broadcasting using Broadcasting Satellite (BS) or Communications Satellite (CS), cable broadcasting (CATV) using a cable, or the like.

Here, although only one client apparatus 20 is illustrated in the transmission system 1 of FIG. 1 to simplify the description, a plurality of client apparatuses 20 can be provided, and the plurality of client apparatuses 20 can simultaneously receive the digital broadcasting signal transmitted (simultaneously transmitted) by the transmission side system 10 through the transmission path 80.

In addition, a plurality of transmission side systems 10 can also be provided. Each of the plurality of transmission side systems 10 can transmit digital broadcasting signals including broadcast streams in separate channels, such as separate frequency bands, and the client apparatus 20 can select a channel for receiving the broadcast stream from among the respective channels of the plurality of transmission side systems 10.

(Configuration of Client Apparatus)

Figure 2:
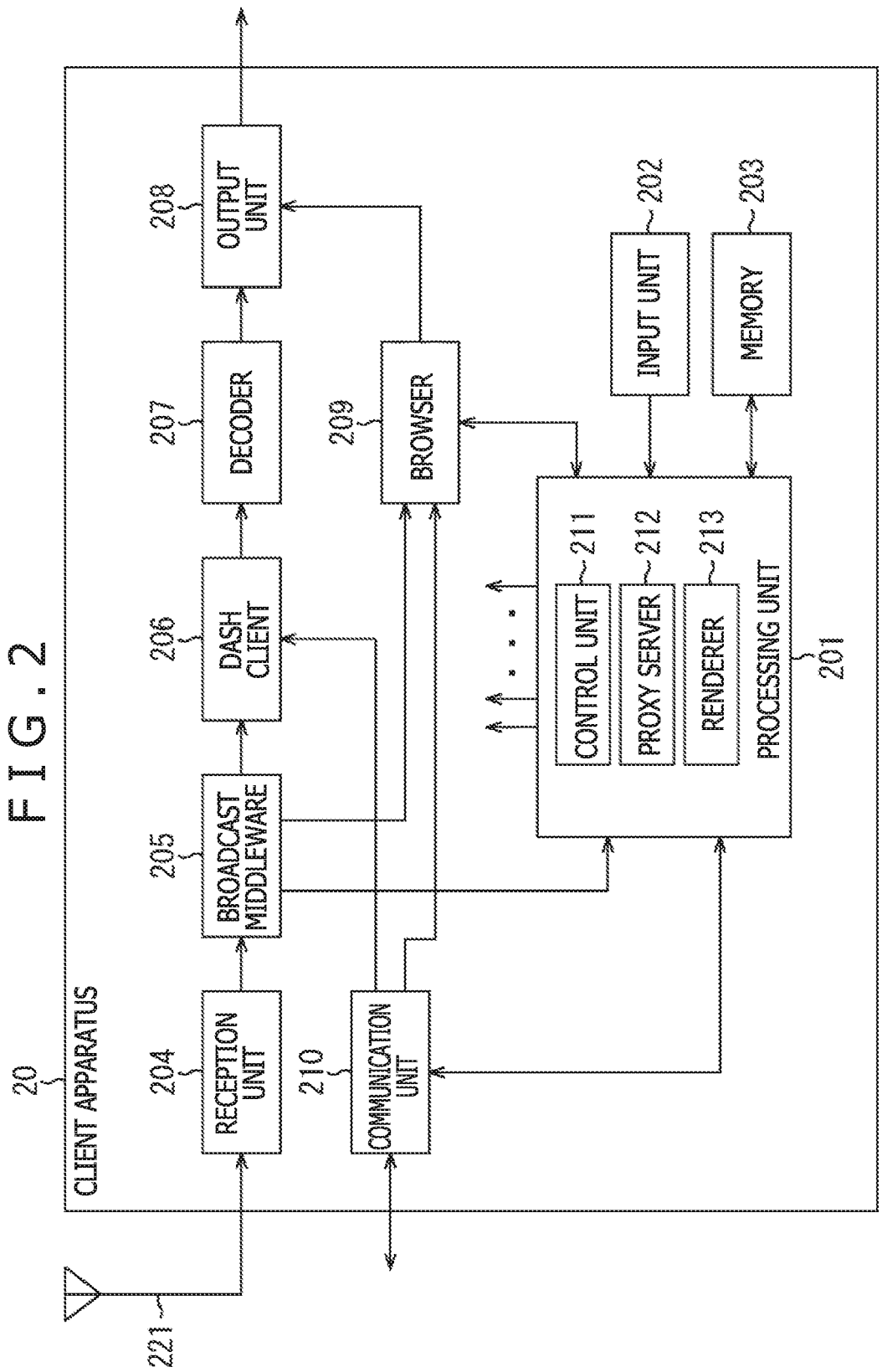
FIG. 2 depicts a configuration example of a client apparatus.

FIG. 2 depicts a configuration example of the client apparatus 20 of FIG. 1.

In FIG. 2, the client apparatus 20 includes a processing unit 201, an input unit 202, a memory 203, a reception unit 204, broadcast middleware 205, a DASH client 206, a decoder 207, an output unit 208, a browser 209, and a communication unit 210.

The processing unit 201 executes a process and the like of controlling the operation of each component of the client apparatus 20.

The input unit 202 supplies an operation signal according to the operation of the user to the processing unit 201. The processing unit 201 controls the operation of each component of the client apparatus 20 on the basis of the operation signal supplied from the input unit 202. The memory 203 stores various types of data according to the control from the processing unit 201.

The reception unit 204 includes a tuner and the like. The reception unit 204 uses an antenna 221 to receive and process the broadcast wave (digital broadcasting signal) transmitted (simultaneously broadcasted) from the broadcast server 105 through the transmission path 80 and supplies the data obtained by the process to the broadcast middleware 205.

The broadcast middleware 205 processes the data supplied from the reception unit 204 and supplies the data to the processing unit 201, the DASH client 206, or the browser 209. Here, the MPD metadata and the DASH segment in the data to be processed are supplied to the DASH client 206, and the data related to the application is supplied to the browser 209. The data of signaling and the like is supplied to the processing unit 201.

The MPD metadata and the DASH segment are supplied to the DASH client 206 from the broadcast middleware 205. The DASH client 206 processes the DASH segment on the basis of the MPD metadata. The video and audio data obtained by processing the DASH segment is supplied to the decoder 207.

The decoder 207 decodes the video and audio data supplied from the DASH client 206 according to a predetermined decoding system (for example, HEVC (High Efficiency Video Coding), AAC (Advanced Audio Coding), or the like). The video and audio data obtained by the decoding is supplied to the output unit 208.

The output unit 208 outputs the video and audio data supplied from the decoder 207. As a result, the client apparatus 20 reproduces the content of a program, a commercial, or the like and outputs the video and the sound.

The browser 209 is a browser corresponding to, for example, HTML5. The browser 209 processes the data of the application supplied from the broadcast middleware 205 and supplies the data to the output unit 208. The output unit 208 outputs the data of the application supplied from the browser 209. As a result, the client apparatus 20 displays the video of the application in conjunction with the program or the like.

The communication unit 210 exchanges data with the communication server 106 through the Internet 90 according to the control from the processing unit 201. The MPD metadata and the DASH segment in the data received by the communication unit 210 are supplied to the DASH client 206, and the data related to the application is supplied to the browser 209. The data of signaling and the like is supplied to the processing unit 201. The process applied to the data acquired through communication is similar to the process applied to the data acquired through broadcast, and the description will not be repeated here.

The processing unit 201 further includes a control unit 211, a proxy server 212, and a renderer 213. The control unit 211 controls the operation of each component of the client apparatus 20. The proxy server 212 executes a process and the like related to transmission and reception of data to be processed. The renderer 213 executes a process for outputting the data to be processed.

The client apparatus 20 is configured in this way.

2. Outline of the Present Technique (Protocol Stack of the Present Technique)

Figure 3:
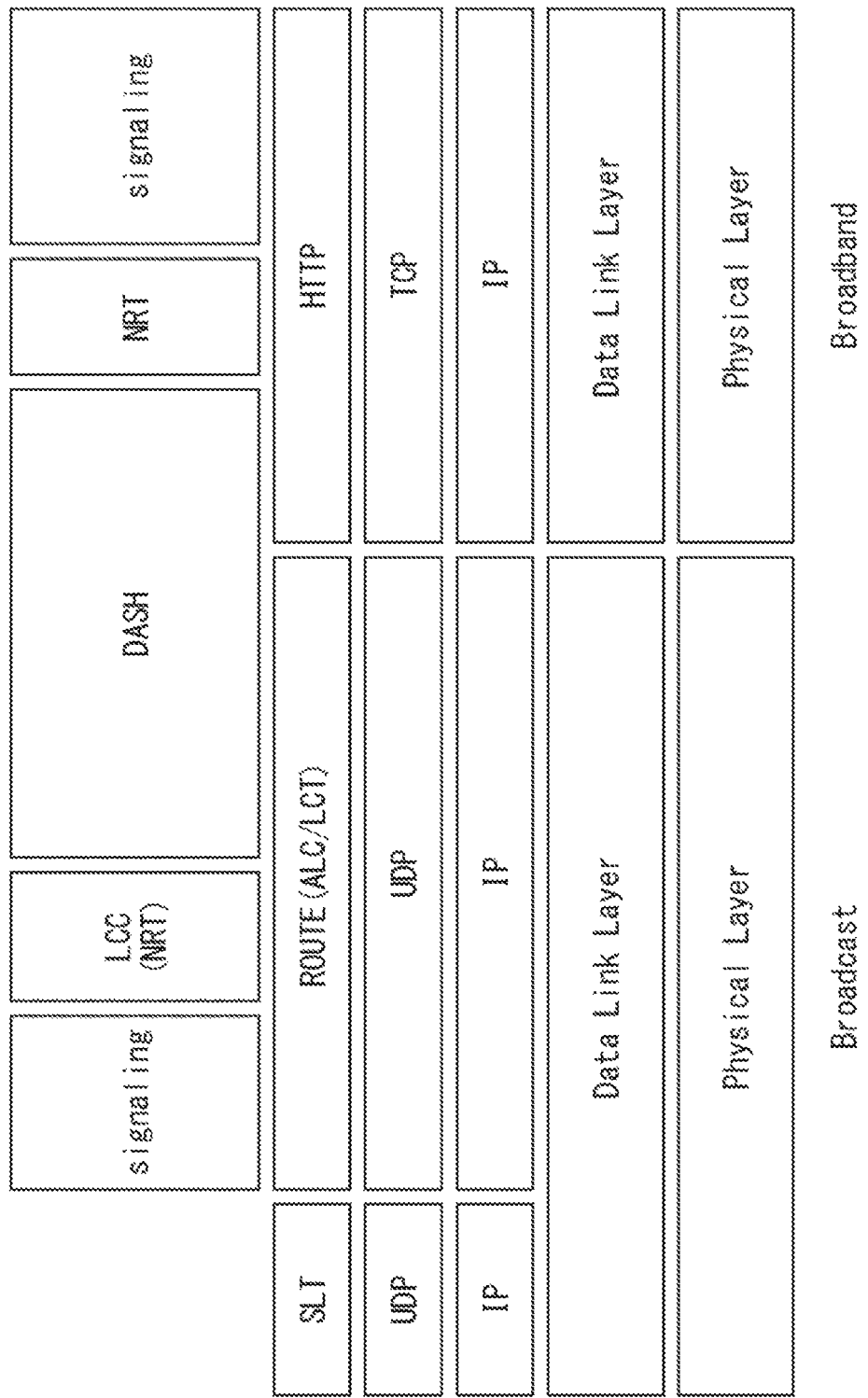
FIG. 3 depicts an example of a protocol stack of an IP transmission system according to the present technique.

FIG. 3 depicts an example of a protocol stack of the IP transmission system of the present technique.

In FIG. 3, the lowest class is a physical layer (Physical Layer). In the digital broadcasting of the IP transmission system of ATSC 3.0 or the like, two-way communication is used to transmit part of the data in some cases, instead of using one-way broadcasting to transmit the data. In the case of using the broadcast (Broadcast), the physical layer (Physical Layer) corresponds to the frequency band of the broadcast wave allocated for the service (channel).

The class above the physical layer (Physical Layer) is a data link layer (Data Link Layer). In addition, the class above the data link layer is an IP layer. The IP layer is equivalent to a network layer in a hierarchical model of communication, and the IP packet is specified by the IP address. The class above and adjacent to the IP layer is a UDP (User Datagram Protocol) layer equivalent to a transport layer in the hierarchical model of communication, and the class above the UDP layer is ROUTE.

In addition, SLT metadata is stored in the class above the UDP layer, that is, IP packet including UDP packet (IP/UDP packet), and the SLT metadata is transmitted. The SLS metadata is LLS signaling and includes basic information indicating the configuration of the stream or service in the broadcast network.

The ROUTE is a protocol for transferring a streaming file and is an extension of FLUTE. Part of the class above and adjacent to the ROUTE is signaling (Signaling) and LCC (Locally Cached Content) content (LCC (NRT)).

Figure 4:
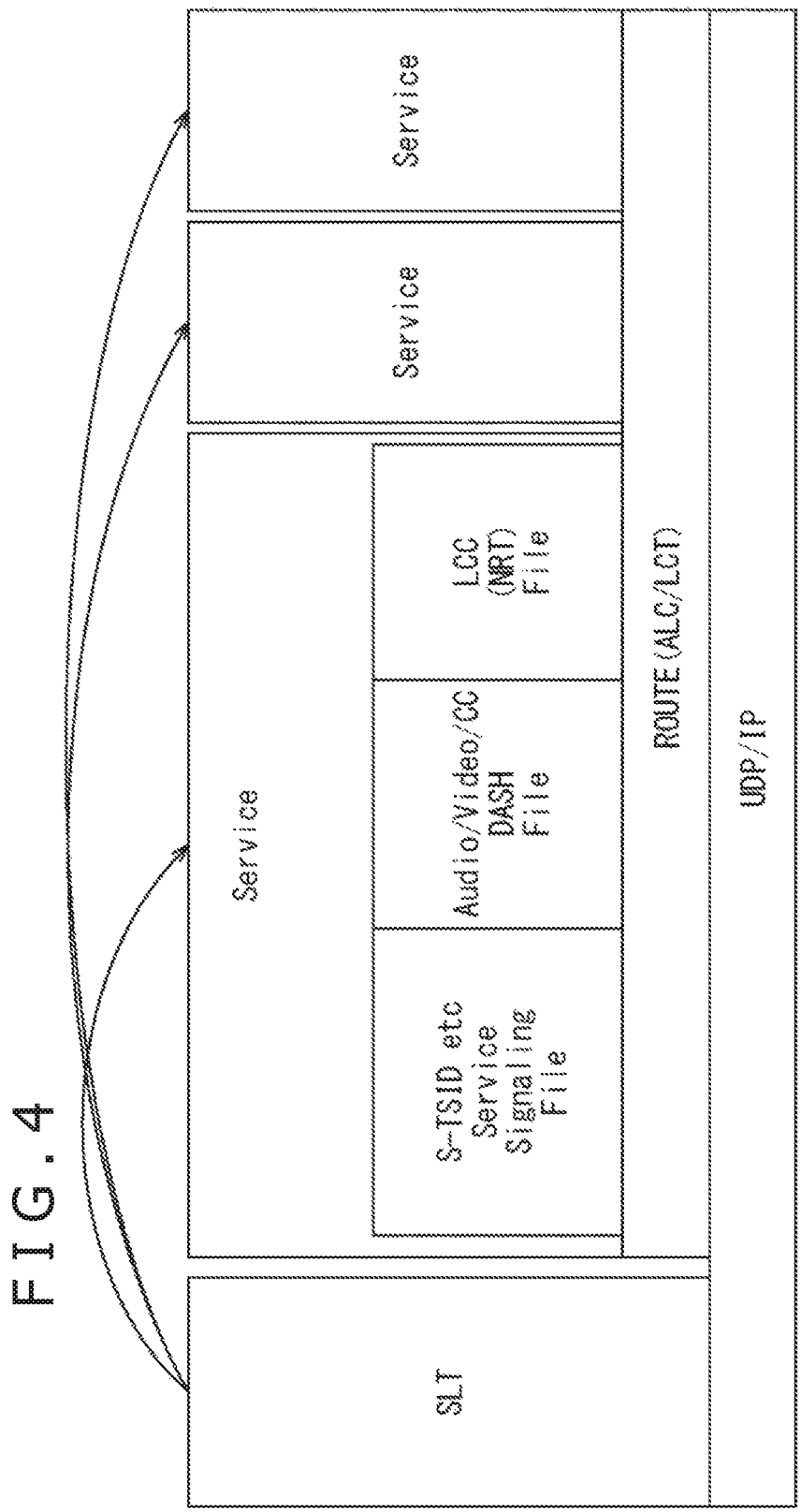
FIG. 4 depicts a relationship between LLS signaling and SLS signaling.

The signaling is SLS signaling and includes, for example, metadata of USD, S-TSID, MPD, and the like. That is, as illustrated in FIG. 4, the client apparatus 20 first acquires the SLT metadata as LLS signaling and then acquires service-based SLS signaling (S-TSID and the like).

Returning to the description of FIG. 3, the LCC content is content reproduced after being temporarily stored in the storage of the client apparatus 20. Note that the LCC (Locally Cached Content) is referred to as NRT (Non Real Time) in some cases. The application can be transmitted as the LCC content in the ROUTE session. In addition, an example of the LCC content transmitted in the ROUTE session includes content of electronic service guide (ESG) or the like.

The class other than the class described above in the class above and adjacent to the ROUTE is a DASH segment (DASH). That is, the stream data of service components (such as video, audio, and subtitles) included in the content of a broadcast program or the like is transmitted in DASH segments according to a standard of ISO BMFF (ISO Base Media File Format) in the ROUTE session.

Furthermore, in a case of using two-way communication (Broadband), the class above the physical layer (Physical Layer) is a data link layer (Data Link Layer). In addition, the class above the data link layer is an IP layer equivalent to a network layer. In addition, the class above and adjacent to the IP layer is a TCP (Transmission Control Protocol) layer equivalent to a transport layer, and furthermore, the class above and adjacent to the TCP layer is an HTTP layer equivalent to an application layer. That is, the protocol, such as TCP/IP, operated on the network, such as the Internet 90, is implemented by the classes.

Part of the class above and adjacent to the HTTP layer is signaling (Signaling) and LCC content (LCC (NRT)). The signaling includes all signaling such as the signaling transmitted by the ROUTE described above. In addition, the LCC content is content acquired through communication and includes, for example, the application.

The class other than the classes described above in the class above and adjacent to the HTTP layer is a DASH segment (DASH). That is, in the streaming delivery of the two-way communication system, the stream data of service components (such as video, audio, and subtitles) included in the content of a VOD program or the like is transmitted in DASH segments according to the standard of ISO BMFF.

In this way, part of the classes of the one-way broadcast system and part of the classes of the two-way communication system have a common protocol in the protocol stack of the IP transmission system of the present technique, and the stream data of the service components included in the content can be transmitted in DASH segments according to the standard of ISO BMFF in the one-way broadcast and the two-way communication. Therefore, in a case where both the streaming delivery of the one-way broadcast system and the streaming delivery of the two-way communication system are performed, the protocol is common in the upper class, and the load of implementation and the load of processing can be reduced in, for example, the broadcast server 105 and the client apparatus 20.

(Control of Application)

Incidentally, a proposal for simple implementation of a control model of an application is requested in providing a service using an application associated with content of a program, a commercial, or the like. For example, although the use of an AST (Application Signaling Table) in the delivery life cycle control of the application is investigated in the ATSC 3.0, simpler implementation of the control model of the application is needed instead of using the AST.

Figure 5:
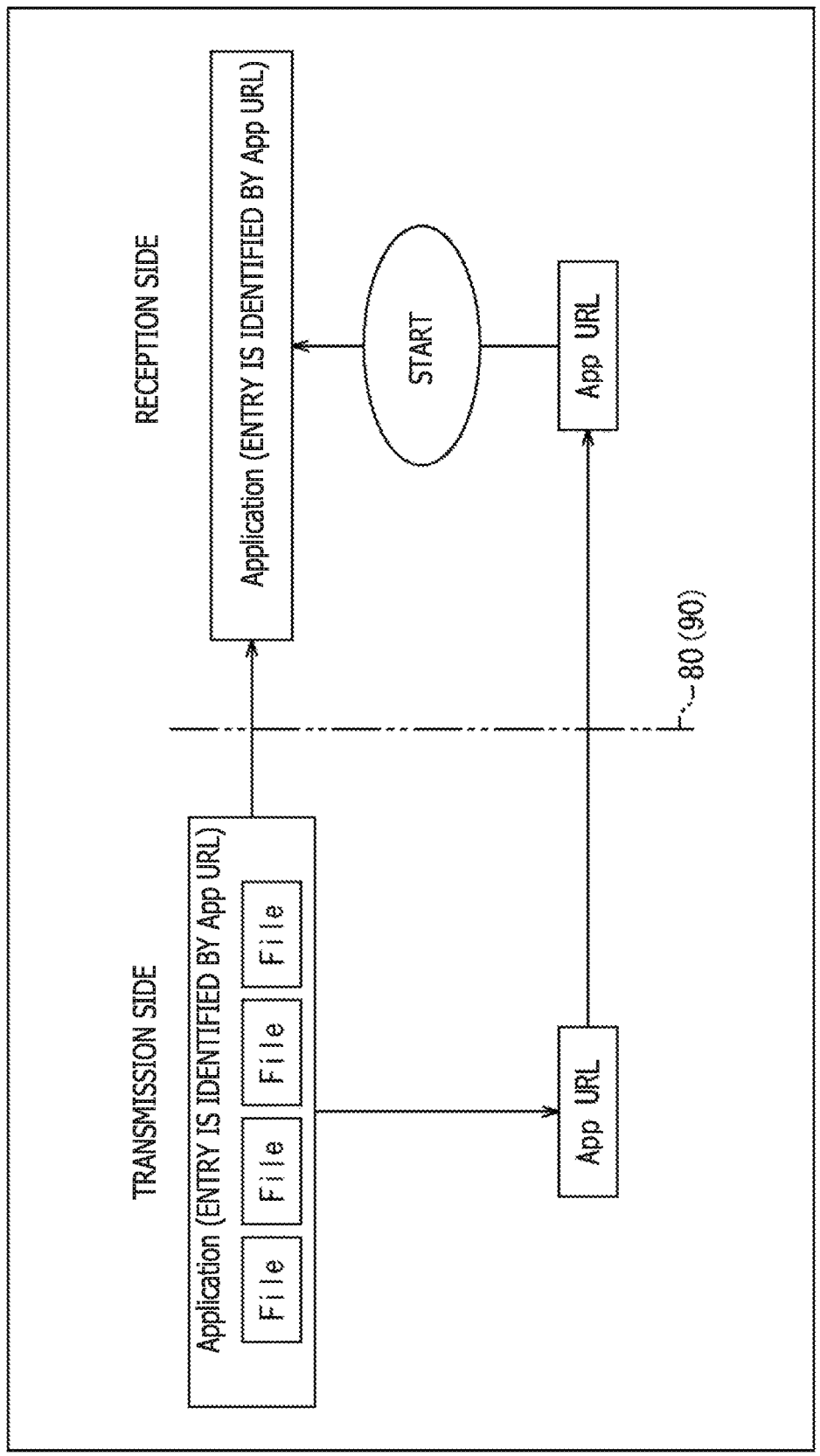
FIG. 5 is a diagram describing application control according to an app URL.

For example, as illustrated in FIG. 5, a URL of the application (hereinafter, referred to as app URL (App URL)) started in associated with the content can be described in a specific file (application manifest file described later), signaling, or the like to simply implement the control model of the application. In the case of the implementation, the client apparatus 20 immediately acquires and starts the application according to the app URL described in the file or signaling when a service is selected.

In the case where the method of starting the application according to the app URL is adopted, a URL (startup page URL) of the file of the first page of the application (startup page file (for example, HTML document file)) can be reported to the client apparatus 20 based on the app URL. On the other hand, various resource files, such as an image file (for example, jpeg file) and a script file (for example, file describing a code of JavaScript (registered trademark)), referenced in the file of the page indicated by the URL (startup page file) is acquired through broadcast or through communication (through the Internet) at a necessary timing according to the needs of the application after the acquisition of the file of the first page (startup page file).

In this case, the browser 209 (FIG. 2) of the client apparatus 20 parses (analyzes the sentence structure) the file of the page acquired first (startup page file), and once the URLs indicating the acquisition locations of necessary resource files are resolved, the browser 209 issues a request for acquiring the resource files specified by each of the URLs. In general, a plurality of resource files are referenced in the HTML document (page), and the application (page of the application) needs to be displayed at the point that all resource files are provided in the memory 203 (FIG. 2) of the client apparatus 20.

Here, in the ATSC 3.0, the location (destination of HTTP request) accessed by the browser 209 (FIG. 2) of the client apparatus 20 is the local proxy server 212 (FIG. 2). The broadcast middleware 205 (FIG. 2) that terminates the signaling and the transport protocol defined by the ATSC 3.0 then expands the signaling and the content delivered through broadcast to a local file system. A server side script (module) or the like implemented on the local proxy server 212 (FIG. 2) executes program processing to respond, directly or together with the broadcast middleware 205 (FIG. 2), to the acquisition request from the application or the like (client) executed on the DASH client 206 (FIG. 2) or the browser 209 (FIG. 2). Such a model is expected in the ATSC 3.0.

As described, even if the browser 209 (FIG. 2) parses the first HTML document file (startup page file) and issues an acquisition request of the resource files referenced by the HTML document file, the resource files need to be expanded on the local file system, or the server side script (module) of the local proxy server 212 (FIG. 2) needs to be able to access the resource files.

That is, if such a state is not set, the acquisition request of the resource files is timed out before all of the resource files of the HTML document file (startup page file) can be displayed. The user may misunderstand that the application (page of the application) is loaded in an incomplete state. Therefore, it is essential that all resource files be prepared first all at once.

Furthermore, for example, in an application associated with a broadcast program, the resource files presented for each scene are generally changed (added) one after another after the first HTML document file (startup page file) is loaded, and the protocol processing or the memory management cannot be optimized unless necessary resource files can be looked over across the entire program. That is, the amount of resource files and the timing of the resource files necessary in the future need to be looked over across the entire program to optimize the distribution or the like of the computing resources of the client apparatus 20 to each service (program).

In the present technique, the following proposal is made to solve the problems. That is, transfer control attributes including the URL (startup package URL) regarding the startup package file are described in the EFDT that is control information of the ROUTE protocol, and the URL (startup page URL) designating the startup page file (for example, HTML document file) of the entry of the target application is described in the application manifest file included in the startup package file.

That is, the startup page URL is equivalent to the app URL (FIG. 5). More specifically, the delivery life cycle control is not performed in the application control of the present technique unlike in the application control in the case where application control information, such as AIT and AST, is used. The application is instantly started (acquired) according to the startup page URL (app URL of FIG. 5), and the control model of the application can be more simply implemented.

Note that the startup package file is a file configured in a package mode of ROUTE, and the startup package file can include a startup page file (for example, HTML document file) and resource files (for example, image file, script file, and the like).

In addition, the attributes that can be used to optimize the delivery scheduling of all resource files included in the target application can be described in the application manifest file of the startup package file. When there is a resource list for looking over the entire resource files, the reliability and the like of the acquisition timing of the resource files can be improved. Furthermore, the transfer attributes of each resource file can be described in the EFDT describing the transfer control attributes including the URL of each file.

Figure 6:
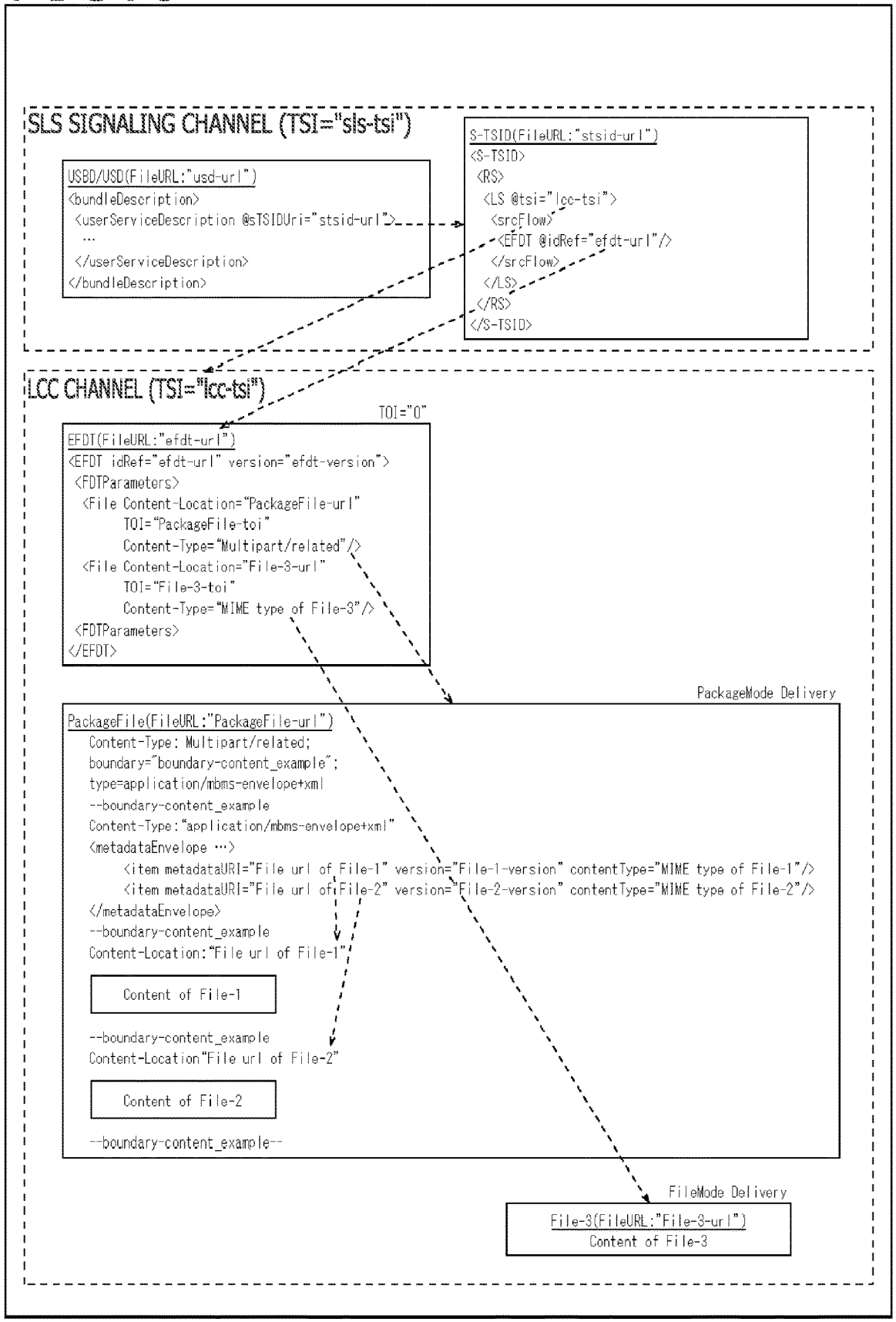
FIG. 6 depicts a relationship between an SLS signaling channel and an LCC channel.

Note that as described above, the SLS signaling and the LCC content are transmitted in the ROUTE session, and as illustrated in FIG. 6, one of LCT channels (sessions) described by the S-TSID used to control the service layer of the ROUTE protocol is allocated for the transfer of the LCC content that is non-real-time content. Furthermore, in the LCT channel for the LCC content, transfer control parameters of a file group to be transferred in the channel are described by the EFDT transmitted in a file mode. Here, the file mode (File Mode) is a mode of transferring a single file. On the other hand, the package mode (Package Mode) is a mode of transferring a package of a plurality of files all at once (packaged together).

(Configuration of Startup Package File)

FIG. 7 depicts an example of the structure of the startup package file.

The startup package file is delivered in the package mode, and the startup page file (for example, HTML document file) and the resource files (for example, image file, script file, and the like) can be packaged together with the application manifest file.

Here, an example of the format that can be used for the application manifest file includes Web App Manifest ("https://www.w3.org/TR/appmanifest/") being standardized by W3C (World Wide Web Consortium).

In addition, as illustrated in FIG. 7, the format used for the application manifest file can be identified by the MIME type or the like designated in a content-Type attribute of an item element of MetadataEnvelope stored in the root part of the Multipart MIME format used in the package mode. Note that an upper item element of two elements illustrated in FIG. 7 corresponds to the format of the application manifest file, and a lower item element corresponds to the format of the startup page file.

For example, in the current application manifest file, the format of Web App Manifest of W3C is used in a case where "application/w3c-manifest+json" is designated for the content-Type attribute of the item element of MetadataEnvelope. FIG. 8 illustrates an example of the format of Web App Manifest of W3C. In the format of Web App Manifest of FIG. 8, the value of the startup page URL can be designated for "start_url."

Although delivery schedule information regarding the delivery schedule of one or a plurality of resource files as part of the application is delivered as resource delivery information in the present technique, the delivery schedule information cannot be designated in the format of the current application manifest file.

Therefore, the Web App Manifest as one of the formats of the application manifest file is extended in the present technique to allow designating not only the startup page URL, but also the delivery schedule information of each resource file.

In this regard, to distinguish the Web App Manifest after the extension (hereinafter, also referred to as extended Web App Manifest) from the Web App Manifest of W3C (FIG. 8), "application/atsc-manifest+json" is designated (FIG. 9) for the content-Type attribute of the item element of MetadataEnvelope of the startup package file (FIG. 7) in the case where the extended Web App Manifest is used as a format of the application manifest file. Note that "json" denotes that the data is expressed by a JSON (JavaScript (registered trademark) Object Notation) format that is a type of text format.

(Structure of Extended Web App Manifest)

FIG. 10 depicts an example of the format of the extended Web App Manifest. Note that the example of the format is described in the JSON format. The objects in the JSON format are expressed by pairing the keys and the values by colons (:), separating the pairs by commas (,) to list zero or more pairs, and enclosing the entire objects by curly brackets ({ }).

In the extended Web App Manifest of FIG. 10, the delivery schedule information of each resource file can be designated as delivery schedule attributes, in addition to the startup page URL. Examples of the delivery schedule attributes that can be designated include the information indicating the acquisition location of the resource file, the size of the resource file, and the delivery time of the resource file.

For example, in the extended Web App Manifest of FIG. 10, a value indicating the file URL of the resource file is designated and paired with a key "url." Here, the file URL of the resource file is a required value. Furthermore, a value indicating the size (in bytes) of the resource file is designated and paired with a key "sizes." Here, the size of the resource file is an optional value.

A value indicating the delivery start time in absolute time is designated and paired with a key "absoluteDeliveryTimeStart." Furthermore, a value indicating the delivery end time in absolute time is designated and paired with a key "absoluteDeliveryTimeEnd." Here, the format of the delivery start time and the delivery end time in absolute time can be "YYYY-MM-DDTHH:mm:ssZ." In addition, the delivery start time and the delivery end time in absolute time are optional values.

A value indicating the delivery start time in relative time from the top of the program like normal play time (Normal Play Time) is designated and paired with a key "relativeDeliveryTimeStart." In addition, a value indicating the delivery end time in relative time from the top of the program like normal play time (Normal Play Time) is designated and paired with a key "relativeDeliveryTimeEnd." Here, the format of the delivery start time and the delivery end time in relative time can be "THH:mm:ss.ffffff." In addition, the delivery start time and the delivery end time in relative time are optional values.

Note that, although the delivery schedule attributes for one resource file are designated in the case illustrated in the example of the extended Web App Manifest of FIG. 10, the delivery schedule attributes are described for each resource file in a case where there are a plurality of resource files. On the other hand, there is no need to describe the delivery schedule attribute in a case without a resource file.

(Example of Description of Extended Web App Manifest)

FIG. 11 depicts an example of the description of the extended Web App Manifest.

In the extended Web App Manifest of FIG. 11, delivery schedule attributes of each of two resource files are described along with a startup page URL "StartUpPage-url."

In the delivery schedule attributes of a first resource file, a URL "ResourceFile-10-url" is designated for the file URL of the resource file, and 123 bytes is designated for the size of the resource file. Furthermore, in the delivery schedule attributes of the first resource file, "T00:10:22.123456" and "T00:12:33.654321" are designated for the delivery start time and the delivery end time in relative time of the resource file.

In the delivery schedule attributes of a second resource file, a URL "ResourceFile-11-url" is designated for the file URL of the resource file, and 4567 bytes is designated for the size of the resource file. Furthermore, in the delivery schedule attributes of the second resource file, "T00:13:44.345678" and "T00:16:55.654321" are designated for the delivery start time and the delivery end time in relative time of the resource file.

Figure 12:
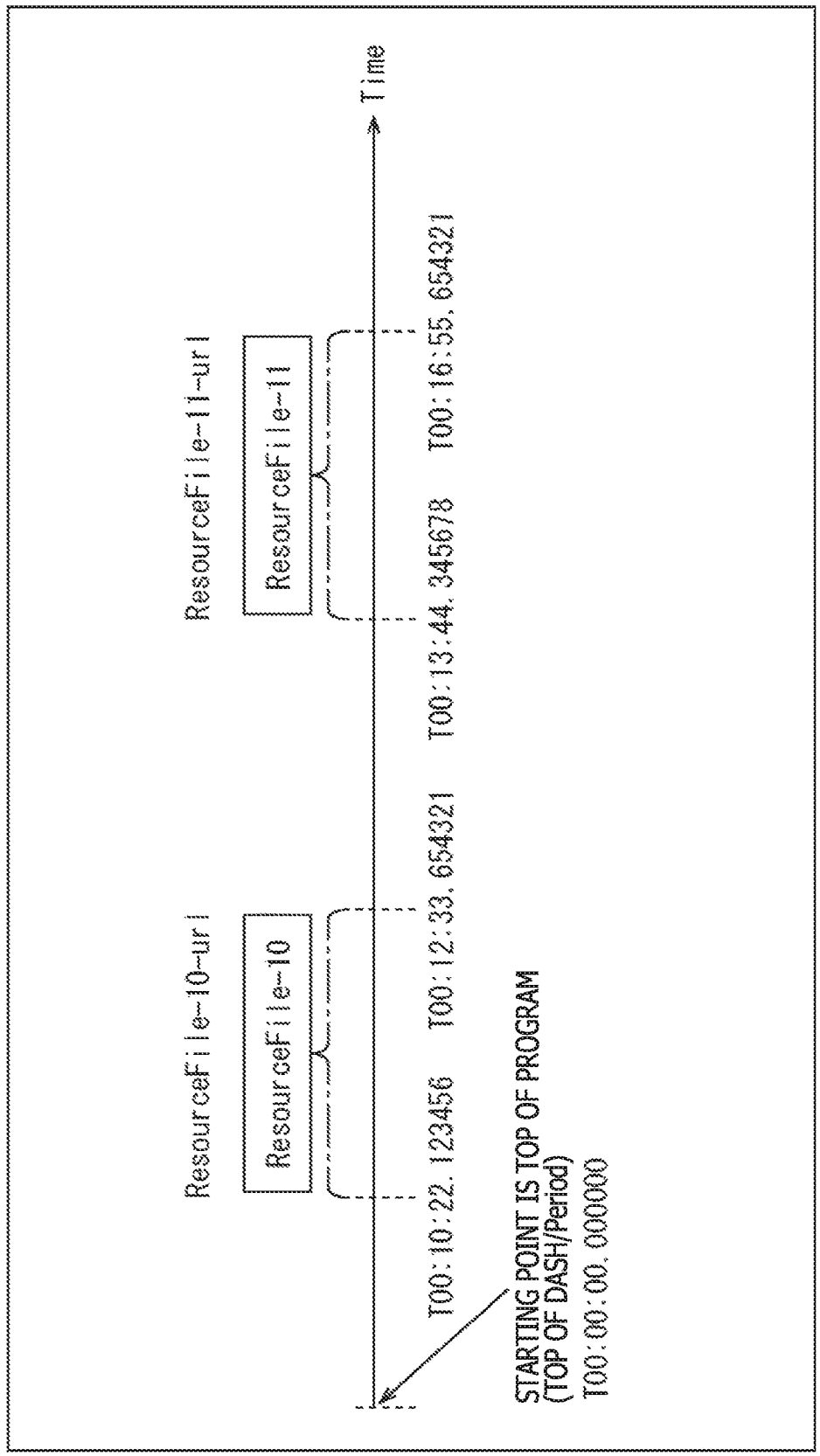
FIG. 12 is a diagram illustrating the example of the description of the extended Web App Manifest of FIG. 11 in chronological order.

A chronological expression of the example of the description of the extended Web App Manifest of FIG. 11 is as illustrated in FIG. 12. That is, in FIG. 12, the direction of time is a direction from the left to the right in FIG. 12, and the resource file with the file URL "ResourceFile-10-url" is presented from "T00:10:22.123456" to "T00:12:33.654321" with the top of the program as a starting point (T00:00:00.000000). In addition, the resource file with the file URL "ResourceFile-11-url" is presented from "T00:13:44.345678" to "T00:16:55.654321" with the top of the program as a starting point (T00:00:00.000000).

Note that the example of FIG. 12 illustrates the case where the resource files are delivered through broadcast. In the case where the resource files are delivered through communication, a display indicating that a target resource file can be acquired from the communication server 106 on the Internet 90 is provided in a designated period.

(Transfer Control Information of EFDT)

Figure 13:
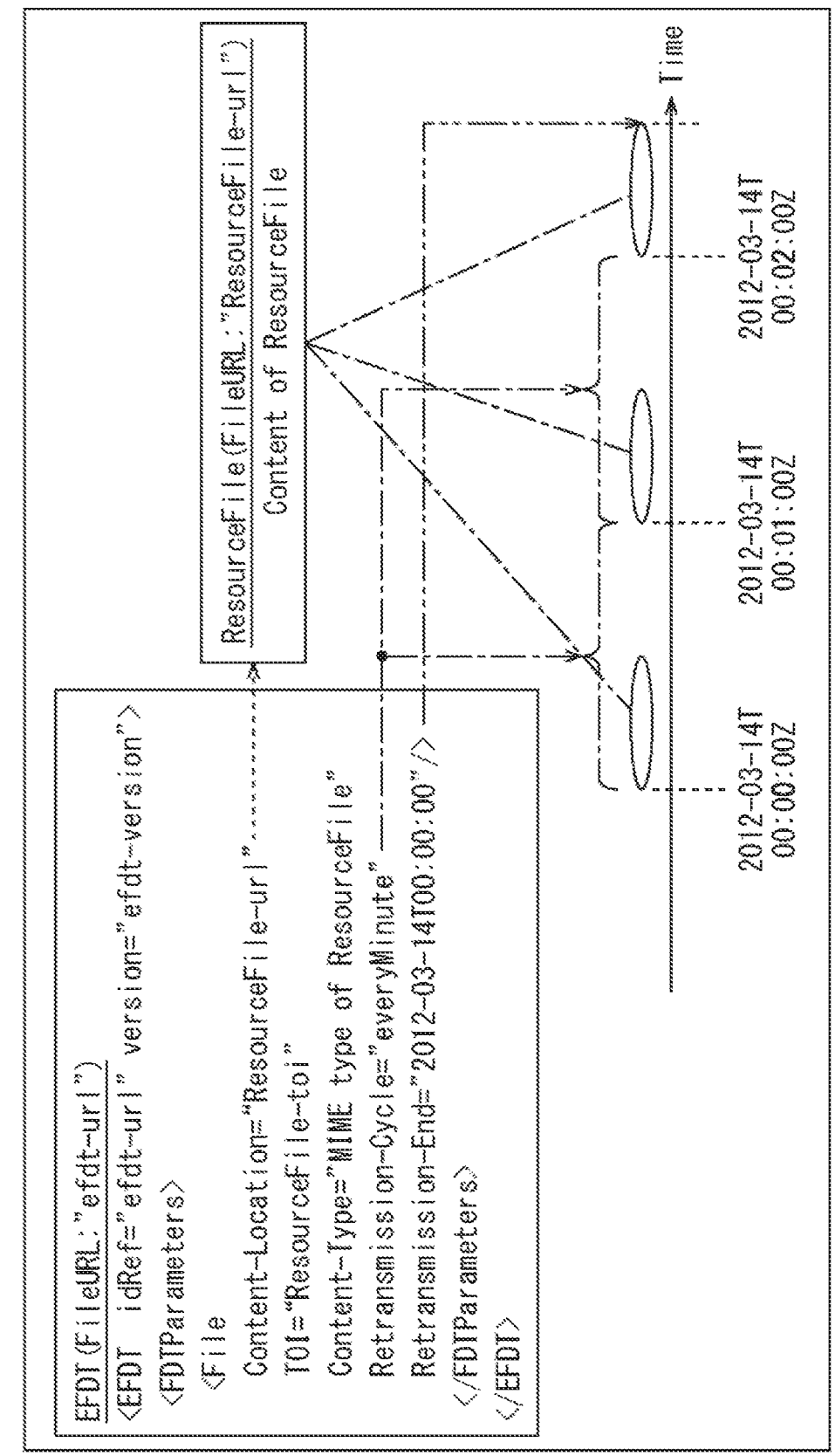
FIG. 13 is a diagram describing transfer control information described in an EFDT.

FIG. 13 is a diagram describing transfer control information described in the EFDT.

The resource delivery information includes transfer control information (transfer control attribute) described in the EFDT, in addition to the delivery schedule information (delivery schedule attributes) described in the format of the extended Web App Manifest.

The transfer control information is information for detailed transfer control of a specific resource file with a delivery schedule that may be changed according to the time zone. In the EFDT, the transfer control information for the detailed transfer control of each resource file can be designated as transfer control attributes. An example of the transfer control attributes that can be designated includes at least one of a retransmission cycle and retransmission end date and time of each resource file.

Here, examples of the attribute of the retransmission cycle (Retransmission-Cycle) of the resource file that can be designated include "everyDay," "everyHour," "everyMinute," "everySecond" and the like.

The "everyDay" denotes that the target resource file may be retransmitted once a day. That is, in a case where "everyDay" is designated for the attribute of the retransmission cycle, the client apparatus 20 can surely acquire the target resource file again when the client apparatus 20 waits for one day.

The "everyHour" denotes that the target resource file may be retransmitted once an hour. The "everyMinute" denotes that the target resource file may be retransmitted once a minute. The "everySecond" denotes that the target resource file may be retransmitted once a second.

In addition, the attribute of the retransmission end date and time (Retransmission-End) of the resource file can be designated in a format of, for example, "YYYY-MM-DDTHH:mm:ss" indicating the date and time of the end of the retransmission.

For example, in the EFDT of FIG. 13, "everyMinute" is described for the attribute of the retransmission cycle (Retransmission-Cycle) of the resource file, and "2012-03-14T00:00:00" is described for the attribute of the retransmission end date and time (Retransmission-End) of the resource file.

A chronological expression of the example of the description of the EFDT of FIG. 13 is as illustrated on the right side of FIG. 13. That is, the direction of time is a direction from the left to the right in FIG. 13 in the time line on the right side of FIG. 13. The resource file identified by "ResourceFile-url" is retransmitted every second (00:00:00, 00:01:00, 00:02:00, . . . ), and the date and time (time) of the end of retransmission is at midnight of Mar. 14, 2012.

The client apparatus 20 can take a hint from the attributes of the retransmission cycle or the retransmission end date and time of the resource file to predict the time of the retransmission of a missing resource file (for example, image file or the like), and scheduling for acquiring the resource file can be optimized.

Note that it is only necessary that the attribute of at least one of the retransmission cycle (Retransmission-Cycle) and the retransmission end date and time (Retransmission-End) of the resource file be described, and for example, a case where only the attribute of the retransmission end date and time is described without description of the attribute of the retransmission cycle denotes that the target resource file is to be retransmitted only once before the date and time (time) designated by the attribute of the retransmission end date and time.

In this way, the delivery schedule information is designated by the application manifest file using the format of the extended Web App Manifest, and the client apparatus 20 can recognize the sizes and the delivery timings of individual resource files throughout the entire program. In addition, the EFDT designates, as transfer control information, the detailed retransmission cycles and retransmission end date and time in the scheduled delivery sections of individual resource files, and the client apparatus 20 can perform more detailed and optimal distribution of the resources subject to reception processing.

3. Specific Example of Operation

Figure 14:
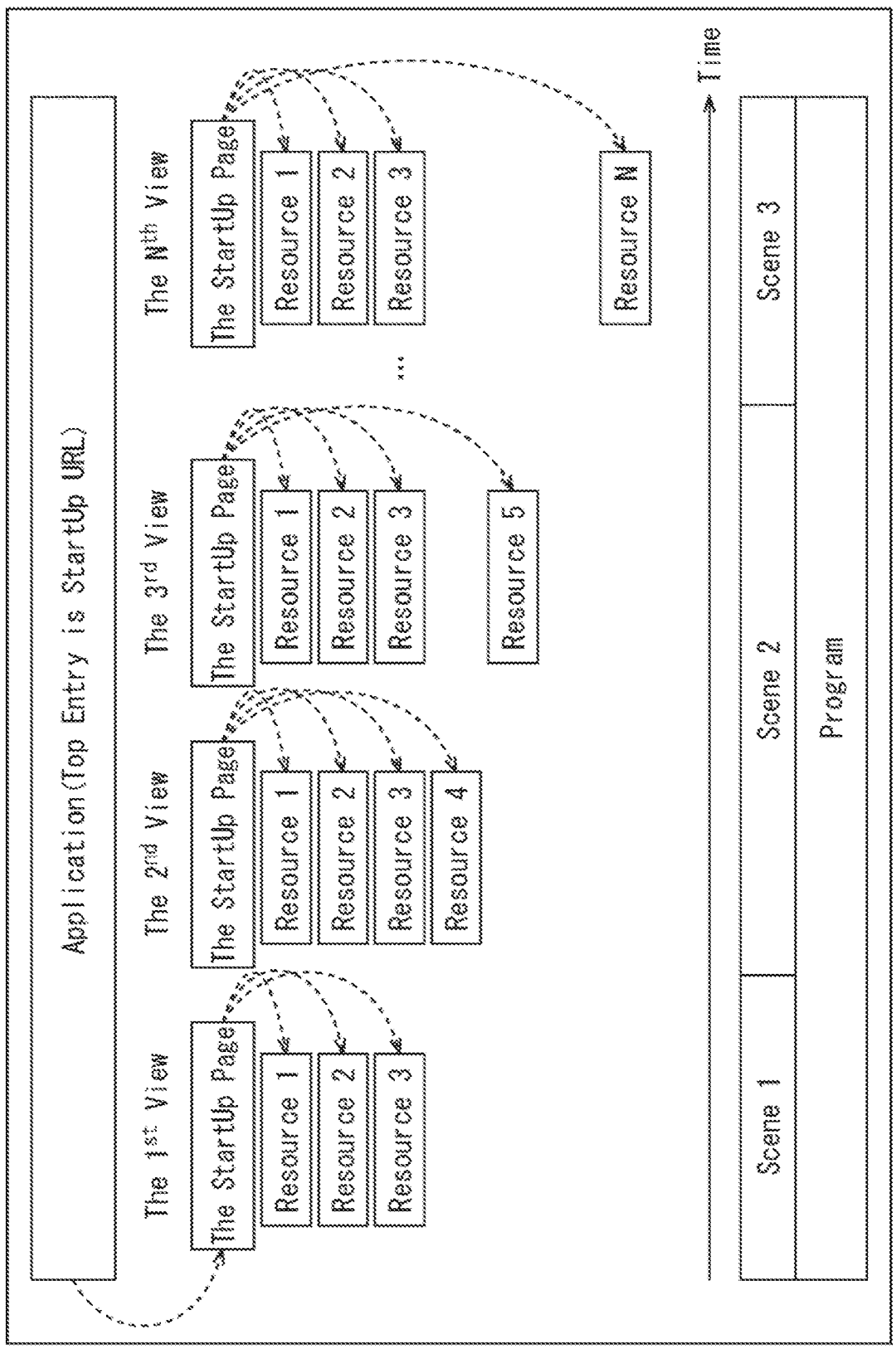
FIG. 14 depicts a configuration example of a typical application.

FIG. 14 depicts a configuration example of a typical application.

In FIG. 14, the direction of time is a direction from the left to the right in FIG. 14. A broadcast program (Program) includes scenes 1 to 3 and makes a transition in the order of the scene 1 (Scene1), the scene 2 (Scene2), and the scene 3 (Scene3).

A startup page file (StartUpPage) that is a first entry of the application is presented in the first scene 1. The startup page file includes, for example, an HTML document file, and various resource files (Resource1, Resource2, and Resource3), such as an image file (for example, jpeg file) and a script file (for example, file describing a code of JavaScript (registered trademark)), are referenced and presented at the same time as a first view (The $1^{st}$ View) of the application.

When the scene 1 shifts to the scene 2, the content of a second view (The $2^{nd}$ View) of the application is presented. In this case, the HTML document file in the second view is the same as the first startup page file, and the difference is that a new resource file (Resource4) is added as content to be presented at the same time.

Furthermore, in the scene 2, the application is switched from the second view to a third view (The $3^{rd}$ View), and the content of the third view is presented. In this case, the HTML document file in the third view is the same as the first startup page file. The difference is that the presented resource file (Resource4) is deleted, and a new resource file (Resource5) is added as content to be presented at the same time.

Note that, although the description is omitted to prevent the repetition, the resource files referenced by the startup page file are added or deleted in each scene, and the view of the application is switched.

In the scene 3 following the scene 2, the application is switched from an (N−1)th view to an Nth view (The $N^{th}$ View), and the content of the Nth view is presented. In this case, the HTML document file is the same as the first startup page file in the Nth view. The presented resource files (Resource4 to Resource N−1) are deleted, and a new resource file (Resource N) is presented as content to be presented at the same time.

In this way, the startup page file is at the center of the control in the application associated with the broadcast program, and the referenced resource files are added or deleted to present the display content (content of the view) according to each scene. Note that there is a method of acquiring a plurality of different HTML document files and using, for example, an inline frame (iframe element defined by HTML) or the like to present the different documents as a series of views. However, the case where the startup page file is at the center of the control will be described in the embodiment of the present technique.

In addition, a case of supporting the following three types of modes as distribution modes (delivery modes) of the application will be described in the embodiment of the present technique. That is, a broadcast mode, a hybrid mode, and a communication mode can be set as a delivery mode.

The broadcast mode (Broadcast Only Mode) is a mode in which the startup page file (HTML document file) configuring the application and the resource files referenced by the startup page file are completed by delivery through broadcast.

The hybrid mode (Hybrid Mode) is a mode in which the startup page file (HTML document file) configuring the application and resource files other than the resource files always referenced by the startup page file are delivered through broadcast or through communication. In this case, the startup package file URL is always described in the EFDT, and as for the other resource files, the transfer control attributes are described only for the resource files delivered through broadcast. The startup page file and the resource files referenced by the startup page files are atomically acquired and displayed.

The communication mode (Broadband Only Mode) is a mode in which the startup page file (HTML document file) configuring the application and all resource files referenced by the startup page file are delivered through communication. In this case, the startup package file URL is always described in the EFDT, and only the application manifest file is stored in the startup package file. Therefore, the transfer control attributes of the other files are not described.

Hereinafter, each case of setting the broadcast mode, the hybrid mode, or the communication mode as a delivery mode will be described.

(A) Broadcast Mode

First, the case where the broadcast mode is set as a delivery mode will be described with reference to FIGS. 15 to 18.

(Flow of Data in Broadcast Mode)

Figure 15:
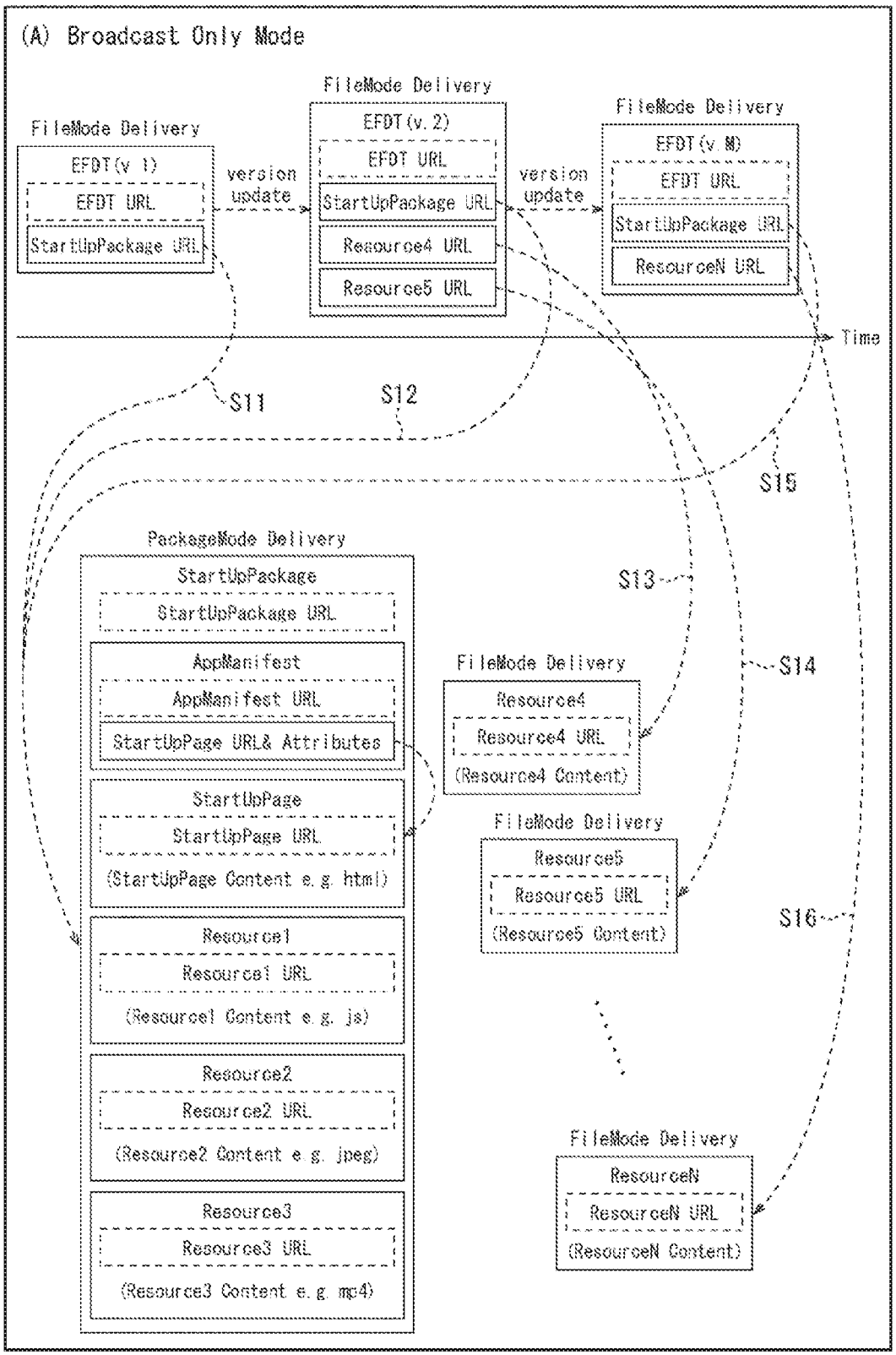
FIG. 15 is a diagram describing a flow of data related to the application processed when a broadcast mode is set.

FIG. 15 is a diagram describing a flow of data related to the application associated with the content processed when the broadcast mode is set in the client apparatus 20 (FIG. 1). Note that the flow of data related to the application in FIG. 15 corresponds to the display content (content of view) of the application presented according to each scene of the broadcast program illustrated in FIG. 14.

In FIG. 15, the EFDT delivered in the LCC channel of the ROUTE session is illustrated in chronological order above the time axis from the left to the right in FIG. 15, while the startup package file and the files of the resources delivered in the LCC channel of the ROUTE session are schematically illustrated below the time axis.

In FIG. 15, the version of the EFDT delivered in the file mode is updated in chronological order. The EFDT of Ver1.0 (v.1) acquired first is an EFDT delivered during the scene 1 (FIG. 14), and an EFDT URL for identifying the EFDT as well as a startup package URL are described. The client apparatus 20 acquires the startup package file delivered in the package mode according to the startup package URL of the EFDT (Ver1.0) (S11).

In the startup package file (StartUpPackage), the startup package URL (StartUpPackageURL) for identifying the startup package file is described, and the application manifest file (AppManifest), the startup page file (HTML document file), and the resource files (Resource1, Resource2, and Resource3) are packaged together.

Note that in the startup package file, the files packaged together with the file of the application manifest include the startup page file (HTML document file) and the resource files (Resource1, Resource2, and Resource3), and it is guaranteed that the files are acquired at the same time as the file of the application manifest.

In addition, the resource files are, for example, image files and script files. For example, the Resource1 is a file describing a code of JavaScript (registered trademark), the Resource2 is an image file in the jpeg format, and the Resource3 is a video file in the mp4 format.

The resource files (Resource1, Resource2, and Resource3) are referenced by the startup page file (HTML document file), and the first view (FIG. 14) of the application is presented.

Here, the format of the extended Web App Manifest (FIG. 10) is adopted for the application manifest file, and the application manifest URL (AppManifestURL) as a file URL is described. In addition, the application manifest file includes the startup page URL (StartUpPageURL) and the delivery schedule information (Attributes) related to the delivery schedule of each resource file. The startup page URL indicates the entry file (startup page file) of the application. In addition, the delivery schedule information includes information and the like related to the file URL, the size, and the delivery time of each resource file.

When the scene 1 shifts to the scene 2, the content of the EFDT is changed, and the version is updated from Ver1.0 (v.1) to Ver2.0 (v.2). The EFDT of Ver2.0 is an EFDT delivered during the scene 2 (FIG. 14), and the URLs and the like of the resource file (Resource4) presented at a part of a previous stage of the scene 2 and the resource file (Resource5) presented at a part of a later stage of the scene 2 are described along with the startup package URL.

The startup package file acquired according to the EFDT of Ver1.0 is referenced by the startup package URL of the EFDT of Ver2.0 (S12), and the resource files (Resource4 and Resource5) delivered in the file mode through broadcast are acquired by the resource file URL (S13 and S14).

That is, the startup page file (HTML document file) is the same as the first startup page file, and the second view (FIG. 14) after the addition of a new resource file (Resource4) and the third view (FIG. 14) after the deletion of the resource file (Resource4) and the addition of the resource file (Resource5) are presented.

In the second view (FIG. 14), the startup page file (HTML document file) refers to the Resource1 to the Resource4 as resource files. In addition, in the third view (FIG. 14), the startup page file (HTML document file) refers to the Resource1 to the Resource3 and the Resource5 as resource files.

Furthermore, the version of the EFDT is sequentially updated from Ver2.0 (v.2) to Ver M (v.M) while the scene 2 shifts to the scene 3. The EFDT of Ver M is an EFDT delivered during the scene 3 (FIG. 14), and the URL and the like of the resource file (Resource N) are described along with the startup package URL.

The startup package file acquired according to the EFDT of Ver1.0 is referenced by the startup package URL of the EFDT of Ver M (S15), and the resource file (Resource N) delivered in the file mode through broadcast is acquired by the resource file URL (S15 and S16).

That is, the startup page file (HTML document file) is the same as the first startup page file, and the Nth view (FIG. 14) after the deletion of the resource files (Resource4 to Resource N-1) and the addition of the resource file (Resource N) is presented. In the Nth view (FIG. 14), the startup page file (HTML document file) refers to the Resource1 to the Resource3 and the Resource N as resource files.

Next, flows of processes executed by each apparatus of the transmission system 1 (FIG. 1) in the case where the broadcast mode is set will be described with reference to flow charts of FIGS. 16 to 18.

(Flow of Processes on Transmission Side)

First, a flow of processes on the transmission side executed by the transmission side system 10 in the case where the broadcast mode is set will be described with reference to the flow chart of FIG. 16. Note that in the processes on the transmission side, processes related to the application associated with the content executed by the application server 103, the SCH/PKG server 104, and the broadcast server 105 will be mainly described, and processes related to the content of a broadcast program or the like executed by the DASH server 101 and the like will not be described.

Figure 16:
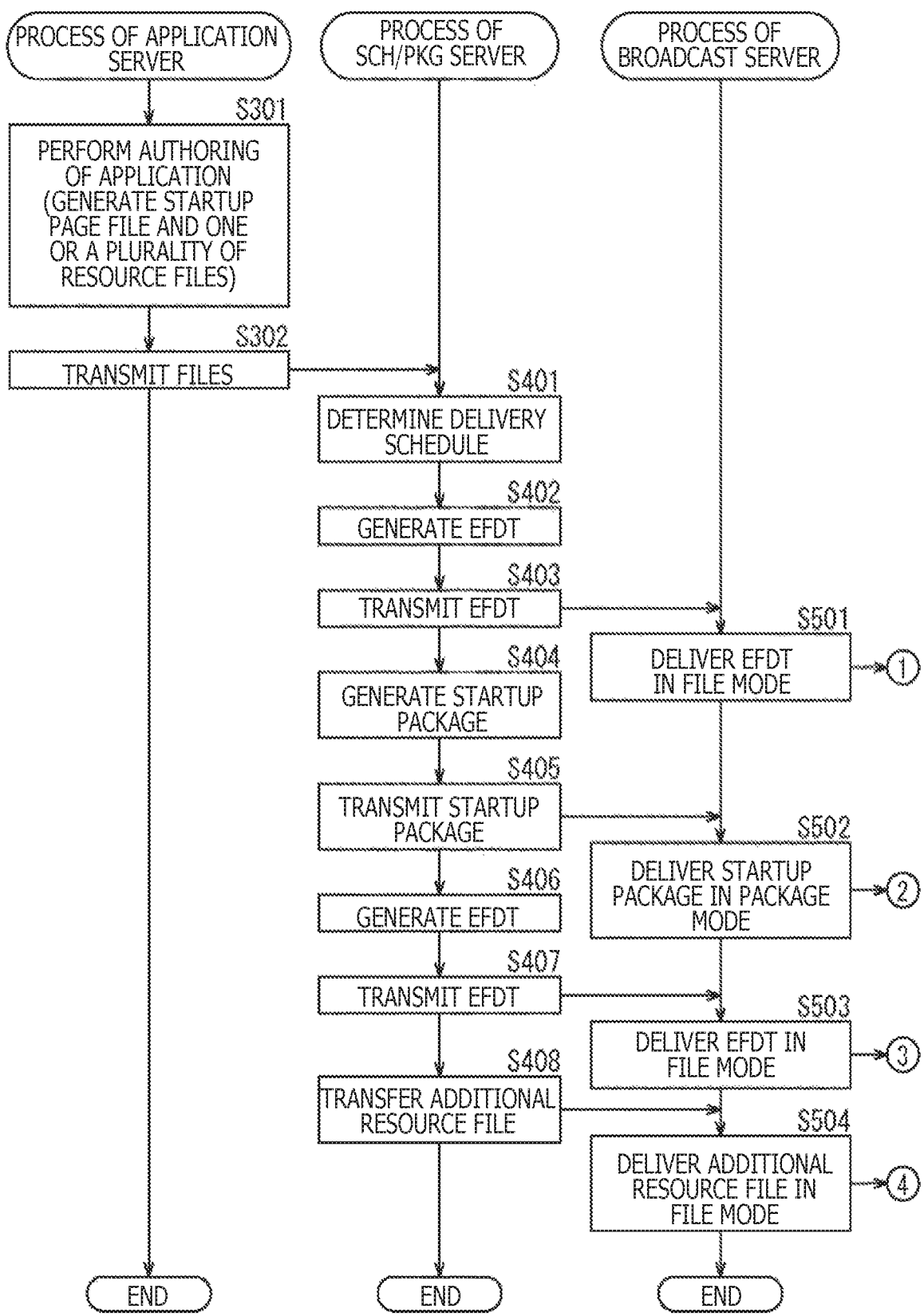
FIG. 16 is a flow chart describing a flow of processes on a transmission side in the case where the broadcast mode is set.

Processes of steps S301 and S302 of FIG. 16 are executed by the application server 103 (FIG. 1).

In step S301, the application server 103 executes an authoring process of the application. In the authoring process, the startup page file and one or a plurality of resource files are generated, and the application including the file group is generated.

In step S302, the application server 103 transmits the file group including the startup page file, one or a plurality of resource files, and the like generated in the process of step S301 to the SCH/PKG server 104.

Processes of steps S401 to S408 of FIG. 16 are executed by the SCH/PKG server 104 (FIG. 1). The SCH/PKG server 104 also receives the file group transmitted in the process of step S302.

In step S401, the SCH/PKG server 104 determines the delivery schedule of the files (resource files) configuring the application.

In step S402, the SCH/PKG server 104 generates the EFDT according to the delivery schedule determined in the process of step S401. Note that the EFDT can include the transfer control information according to the delivery schedule determined in the process of step S401. In step S403, the SCH/PKG server 104 transmits the EFDT generated in the process of step S402 to the broadcast server 105.

In step S404, the SCH/PKG server 104 generates the startup package file on the basis of the file group (for example, startup page file, one or a plurality of resource files, and the like) generated in the process of step S301. Note that the format of the extended Web App Manifest (FIG. 10) can be adopted for the application manifest file stored in the startup package file to include the delivery schedule information according to the delivery schedule determined in the process of step S401.

In step S405, the SCH/PKG server 104 transmits the startup package file generated in the process of step S404 to the broadcast server 105.

In step S406, the SCH/PKG server 104 generates the EFDT according to the delivery schedule determined in the process of step S401. Note that the transfer control information according to the delivery schedule determined in the process of step S401 can be included in the EFDT. In step S407, the SCH/PKG server 104 transmits the EFDT generated in the process of step S406 to the broadcast server 105.

In step S408, the SCH/PKG server 104 transfers the additional resource file in the file group generated in the process of step S301 to the broadcast server 105.

Steps S501 to S504 of FIG. 16 are executed by the broadcast server 105 (FIG. 1). The broadcast server 105 also receives the EFDT transmitted in the process of step S403 or S407, the startup package file transmitted in the process of step S405, and the additional resource file transmitted in the process of step S407.

In step S501, the broadcast server 105 transmits (simultaneously broadcasts) the EFDT generated in the process of step S402 through the transmission path 80 in the file mode.

In step S502, the broadcast server 105 transmits (simultaneously broadcasts) the startup package file generated in the process of step S404 through the transmission path 80 in the package mode.

In step S503, the broadcast server 105 transmits (simultaneously broadcasts) the EFDT generated in the process of step S406 through the transmission path 80 in the file mode.

In step S504, the broadcast server 105 transmits (simultaneously broadcasts) the additional resource file transferred in the process of step S408 (resource files generated in the process of step S301) through the transmission path 80 in the file mode.

This completes the description of the flow of the processes on the transmission side.

(Flow of Processes on Reception Side)

Next, a flow of processes on the reception side executed by the client apparatus 20 in the case where the broadcast mode is set will be described with reference to the flow charts of FIGS. 17 and 18. Note that in the processes on the reception side, processes related to the application associated with the content will be mainly described, and processes related to the content of a broadcast program or the like will not be described. That is, the execution of the processes of FIGS. 17 and 18 is based on the premise that the client apparatus 20 is reproducing the content of the broadcast program delivered from the broadcast server 105, the VOD program delivered from the communication server 106, or the like.

In step S201, the broadcast middleware 205 acquires the SLT metadata stored in the IP/UDP packet and the SLS signaling transmitted in the ROUTE session. Here, the USD metadata is acquired as the SLS signaling to acquire the S-TSID metadata according to the information described in the USD metadata.

In step S202, the broadcast middleware 205 acquires the EFDT delivered in the file mode through the LCC channel of the ROUTE session on the basis of the SLS signaling (S-TSID metadata) acquired in the process of step S201.

In step S203, the broadcast middleware 205 parses the EFDT acquired in the process of step S202.

In step S204, the broadcast middleware 205 acquires the startup package file delivered in the package mode through the LCC channel of the ROUTE session on the basis of the analysis result of the process of step S203.

In step S205, the broadcast middleware 205 determines whether a new startup page URL is described in the application manifest file of the startup package file acquired in the process of step S204.

If the broadcast middleware 205 determines that a new startup page URL is not described in step S205, the process returns to step S201, and the subsequent processes are repeated. Then, if the broadcast middleware 205 determines that a new startup page URL is described in the determination process of step S205 as a result of the repetition of the processes of steps S201 to S205, the process proceeds to step S206.

In step S206, the broadcast middleware 205 notifies the browser 209 of the startup page URL (new) described in the application manifest file of the startup package file. As a result, the activation of the application is started.

Note that at the point of the notification of the startup page URL from the broadcast middleware 205 to the browser 209, the startup page file and one or a plurality of resource files stored in the startup package file acquired in the process of step S204 are expanded on the local file system of the memory 203, or the server side script of the proxy server 212 can be accessed. That is, a reply of the startup page file and the resource files is prepared for immediate response to a request from the browser 209 in the case where the activation of the application is started.

In addition, the format of the extended Web App Manifest (FIG. 10) is adopted for the application manifest file, and the delivery schedule information of each resource file (size and delivery time of resource file) is described. The broadcast middleware 205 or the processing unit 201 (control unit 211) analyzes the delivery schedule information, and the analysis result is stored in the memory 203. Then, for example, when there is enough room for the capacity of the memory 203 in a case of performing memory management of the memory 203, a process of using the analysis result of the delivery schedule information to first reserve a storage area in the memory unit 203 according to the sum of the numbers of bytes of the resource files can be executed.

On the other hand, for example, when there is not enough room for the capacity of the memory 203, a process of referring to the analysis result of the delivery schedule information to reserve the storage area necessary at that point can be executed when the storage area of the memory 203 needs to be reserved. Furthermore, when there is not enough room for the capacity of the memory 203, a process of estimating the size of the resource files to reserve in advance a necessary storage area on the memory 203 can be executed when the resource files (return of the resource files) need to be prepared according to the analysis result of the delivery schedule information (at appropriate timing), before the EFDT of the resource files to be acquired in the future is acquired. However, the processes using the delivery schedule information (analysis result of the delivery schedule information) described here are examples, and various processes according to the delivery of the resource files can be executed.

In step S221, the browser 209 requests the proxy server 212 for the startup page file according to the startup page URL notified in the process of step S206.

In step S207, the proxy server 212 returns the startup page file ready to be returned to the browser 209 in response to the request for the startup page file from the browser 209. As a result, the browser 209 can acquire the startup page file from the proxy server 212.

In step S222, the browser 209 requests the proxy server 212 for the resource files in the startup page file packaged together with the startup page file.

In step S208, the proxy server 212 returns the resource files in the startup page file ready to be returned and packaged together with the startup page file to the browser 209 in response to the request for the resource files in the startup page file from the browser 209.

In step S223, the browser 209 presents the startup page file through the renderer 213 on the basis of the startup page file and the resource files in the startup page file acquired from the proxy server 212. As a result, the application (startup page of the application) is displayed along with content of a broadcast program or the like.

In step S209, the broadcast middleware 205 acquires the EFDT delivered in the file mode through the LCC channel of the ROUTE session on the basis of the SLS signaling (S-TSID metadata) acquired in the process of step S201.

In step S210, the broadcast middleware 205 parses the EFDT acquired in the process of step S209. Note that the version (for example, Ver2.0) of the EFDT acquired in the process of step S209 is newer than the version (for example, Ver1.0) of the EFDT acquired in the process of step S202. In addition, in the case where the transfer control information (FIG. 13) is described as transfer control attributes of the EFDT, the broadcast middleware 205 or the processing unit 201 (control unit 211) can analyze the transfer control information and execute a process according to the analysis result. For example, the retransmission cycle and the retransmission end date and time of a specific resource file are described in the transfer control information (FIG. 13), and the broadcast middleware 205 can acquire the retransmitted specific resource file according to the retransmission cycle or the retransmission end date and time.

In step S211, the broadcast middleware 205 acquires the additional resource file delivered in the file mode through the LCC channel of the ROUTE session on the basis of the analysis result of step S210.

Meanwhile, the browser 209 monitors the presentation timing of the additional resource file (S224). In step S225, the browser 209 determines whether the presentation timing of the additional resource file is detected on the basis of the monitoring result of step S224.

Here, for example, in a case where the presentation timings of all resource files are scheduled (throughout the entire program) in the startup page file, the script can be programmed to fire a timer at the timing to detect the timing of presenting the additional resource file. Furthermore, the script can be programmed such that the startup page file includes an event from the outside (for example, a stream event issued by the application server 103 transferred in-band to the content stream or an interaction with the user), and the timing of presenting the additional resource can be detected.

In either case of detecting the timing, the startup page file can be the same throughout the entire program, and there is no need to update the startup page file. That is, the startup page file in the startup package file is not updated, and the application manifest file, the startup page file, and the resource files referenced first in the startup page file (for example, Resource1, Resource2, and Resource3) are always not updated. Therefore, there is no update of the startup package file.

If the browser 209 determines that the presentation timing of the additional resource file is not detected in step S225, the process returns to step S224, and the monitoring process of steps S224 and S225 is repeated. Then, if the browser 209 determines that the presentation timing of the additional resource file is detected in step S225, the process proceeds to step S226.

In step S226, the browser 209 requests the proxy server 212 for the additional resource file according to the detection result (detection result of presentation timing detection) of the process in step S225.

In step S212, the proxy server 212 returns the additional resource file ready to be returned to the browser 209 in response to the request for the additional resource file from the browser 209. As a result, the browser 209 can acquire the additional resource file from the proxy server 212.

In step S227, the browser 209 controls the renderer 213 to present the additional resource file acquired from the proxy server 212. As a result, the information of the additional resource is added to the application (startup page of the application).

This completes the description of the flow of the processes on the reception side.

(B) Hybrid Mode

Next, the case where the hybrid mode is set as a delivery mode will be described with reference to FIGS. 19 to 22.

(Flow of Data in Hybrid Mode)

Figure 19:
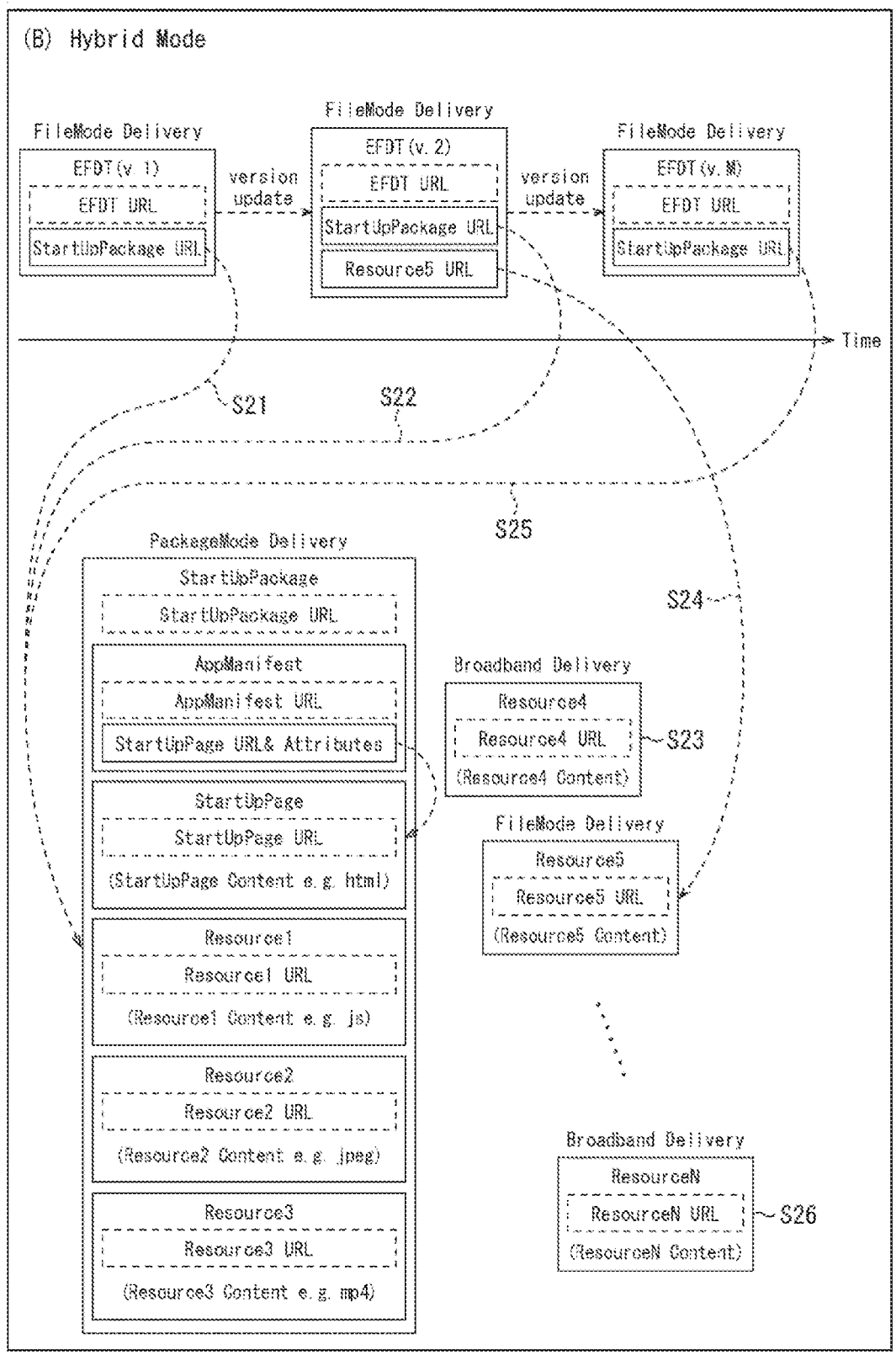
FIG. 19 is a diagram describing a flow of data related to the application processed when a hybrid mode is set.

FIG. 19 is a diagram describing a flow of data related to the application associated with the content processed when the hybrid mode is set in the client apparatus 20 (FIG. 1). Note that the flow of data related to the application in FIG. 19 corresponds to the display content (content of view) of the application presented according to each scene of the broadcast program illustrated in FIG. 14.

In FIG. 19, the client apparatus 20 acquires the startup package file delivered in the package mode according to the startup package URL of the EFDT (Ver1.0) (S21) as in S11 (broadcast mode) of FIG. 15 described above.

In the startup package file, the startup package URL for identifying the startup package file is described, and the application manifest file, the startup page file (HTML document file), and the resource files (Resource1, Resource2, and Resource3) are packaged together.

As a result, the startup page file (HTML document file) refers to the resource files (Resource1, Resource2, and Resource3) in the scene 1 (FIG. 14), and the first view (FIG. 14) of the application is presented.

When the scene 1 shifts to scene 2, the content of the EFDT is changed, and the version is updated from Ver1.0 (v.1) to Ver2.0 (v.2). The EFDT of Ver2.0 is an EFDT delivered during the scene 2 (FIG. 14), and only the URL of the resource file (Resource5) presented at the part of the later stage of the scene 2 is described along with the startup package URL.

That is, while the resource file (Resource5) is delivered through broadcast, the resource file (Resource4) is delivered through communication in the example of FIG. 19. Therefore, only the information regarding the resource file (Resource5) delivered through broadcast is described in the EFDT of Ver2.0.

Then, the startup package file acquired according to the EFDT of Ver1.0 is referenced by the startup package URL of the EFDT of Ver2.0 (S22), and the resource file (Resource4) delivered through communication and the resource file (Resource5) delivered through broadcast are acquired by the resource file URL (S23 and S24).

Here, for example, the file URL of each resource file (Resource4) of the delivery schedule information of the application manifest file is used as the resource file URL of the resource file (Resource4) delivered through communication. In addition, the resource file URL described in the EFDT of Ver2.0 is used as the resource file URL of the resource file (Resource5) delivered through broadcast.

As a result, at the part of the previous stage of the scene 2 (FIG. 14), the startup page file is the same as the first startup page file, and the second view (FIG. 14) after the addition of the resource file (Resource4) delivered through communication is presented. In addition, at the part of the later stage of the scene 2 (FIG. 14), the startup page file is the same as the first startup page file, and the third view (FIG. 14) after the deletion of the resource file (Resource4) and the addition of the resource file (Resource5) delivered through broadcast is presented.

Furthermore, the version of the EFDT is sequentially updated from Ver2.0 (v.2) to Ver M (v.M) while the scene 2 shifts to the scene 3. The EFDT of Ver M is an EFDT delivered during the scene 3 (FIG. 14), and only the startup package URL is described.

Then, the startup package URL of the EFDT of Ver M refers to the startup package file acquired according to the EFDT of Ver1.0 (S25), and the resource file (Resource N) delivered through communication is acquired by the resource file URL (S26).

Here, for example, the file URL of each resource file of the delivery schedule information of the application manifest file can be used as the resource file URL of the resource file (Resource N) delivered through communication.

As a result, the startup page file is the same as the first startup page file, and the Nth view (FIG. 14) after the addition of the resource file (Resource N) delivered through communication is presented in the scene 3.

Next, flows of processes executed by each apparatus of the transmission system 1 (FIG. 1) in the case where the hybrid mode is set will be described with reference to flow charts of FIGS. 20 to 22.

(Flow of Processes on Transmission Side)

First, a flow of processes on the transmission side executed by the transmission side system 10 in the case where the hybrid mode is set will be described with reference to the flow chart of FIG. 20.

Figure 20:
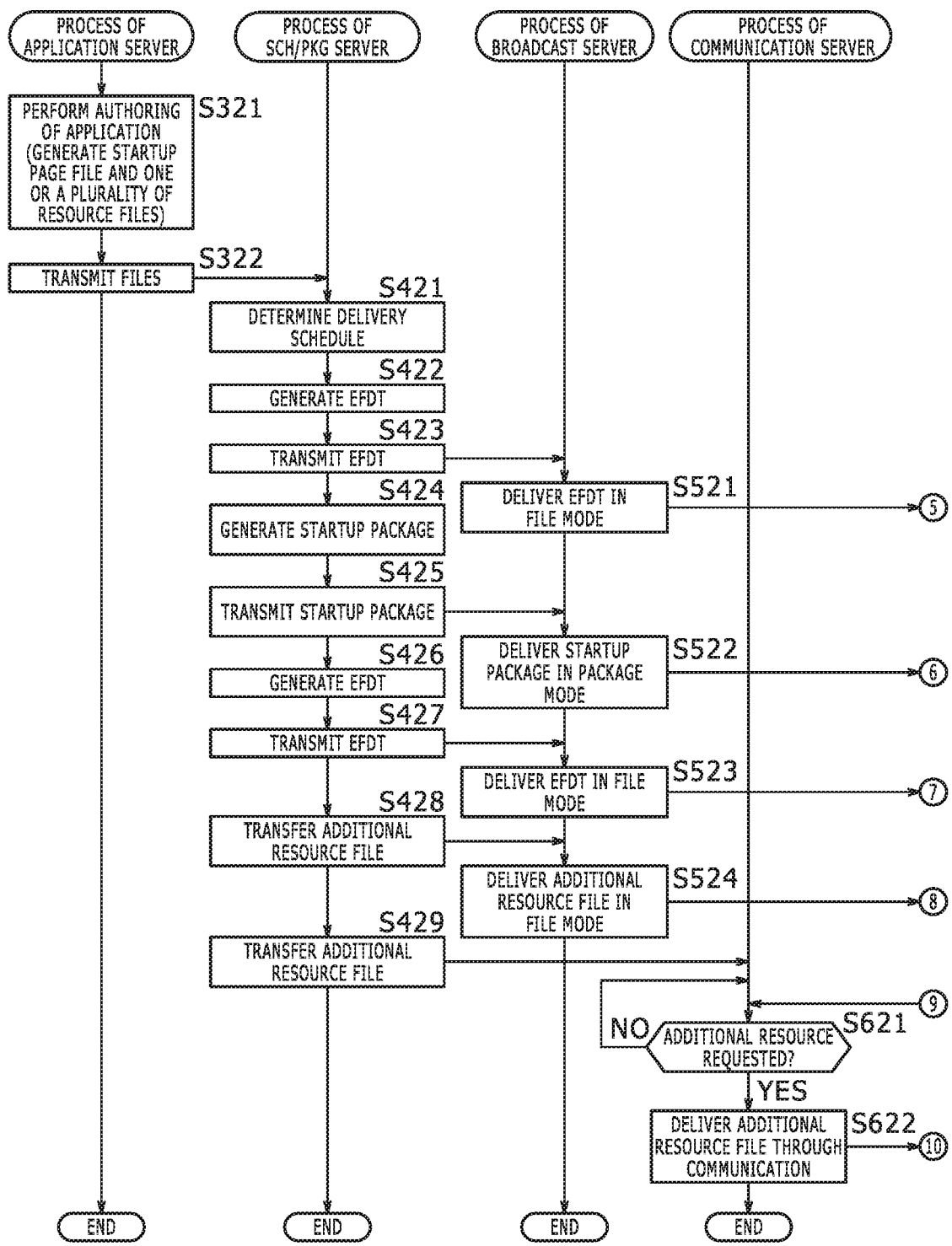
FIG. 20 is a flow chart describing a flow of processes on the transmission side in the case where the hybrid mode is set.

In steps S321 and S322 of FIG. 20, the application server (FIG. 1) executes the authoring process as in steps S301 and S302 of FIG. 16, and the file group configuring the application is generated.

In steps S421 to S429 of FIG. 20, although the SCH/PKG server 104 (FIG. 1) executes the processes of determining the delivery schedule, generating the EFDT, and generating the startup package file as in steps S401 to S408 of FIG. 16, the difference is that the transfer destination of the additional resource file includes not only the broadcast server 105, but also the communication server 106.

That is, in step S428, the SCH/PKG server 104 transfers part of the additional resource file in the file group generated in the process of step S321 to the broadcast server 105. Furthermore, in step S429, the SCH/PKG server 104 transfers part of the additional resource file in the file group generated in the process of step S321 to the communication server 106.

In steps S521 to S524, the broadcast server 105 (FIG. 1) transmits (simultaneously broadcasts) the EFDT and the additional resource file in the file mode and the startup package file in the package mode through the transmission path 80 as in steps S501 to S504 of FIG. 16.

The communication server 106 (FIG. 1) executes steps S621 and S622 of FIG. 20. The communication server 106 also receives the additional resource file transferred in the process of step S429.

In step S621, the communication server 106 determines whether the additional resource file is requested from the client apparatus 20 through the Internet 90. If the communication server 106 determines that the additional resource file is not requested in step S621, the communication server 106 repeats the determination process of step S621.

On the other hand, if the communication server 106 determines that the additional resource file is requested in step S621, the process proceeds to step S622. In step S622, the communication server 106 delivers the additional resource file transferred in the process of step S429 (resource file generated in the process of step S321) to the client apparatus 20 as a requester through the Internet 90.

This completes the description of the flow of the processes on the transmission side.

(Flow of Processes on Reception Side)

Next, a flow of processes on the reception side executed by the client apparatus 20 in the case where the hybrid mode is set will be described with reference to the flow charts of FIGS. 21 and 22. Note that the execution of the processes on the reception side is based on the premise that the client apparatus 20 is reproducing the content of the broadcast program delivered from the broadcast server 105, the VOD program delivered from the communication server 106, or the like as in FIGS. 17 and 18 described above.

Figure 17:
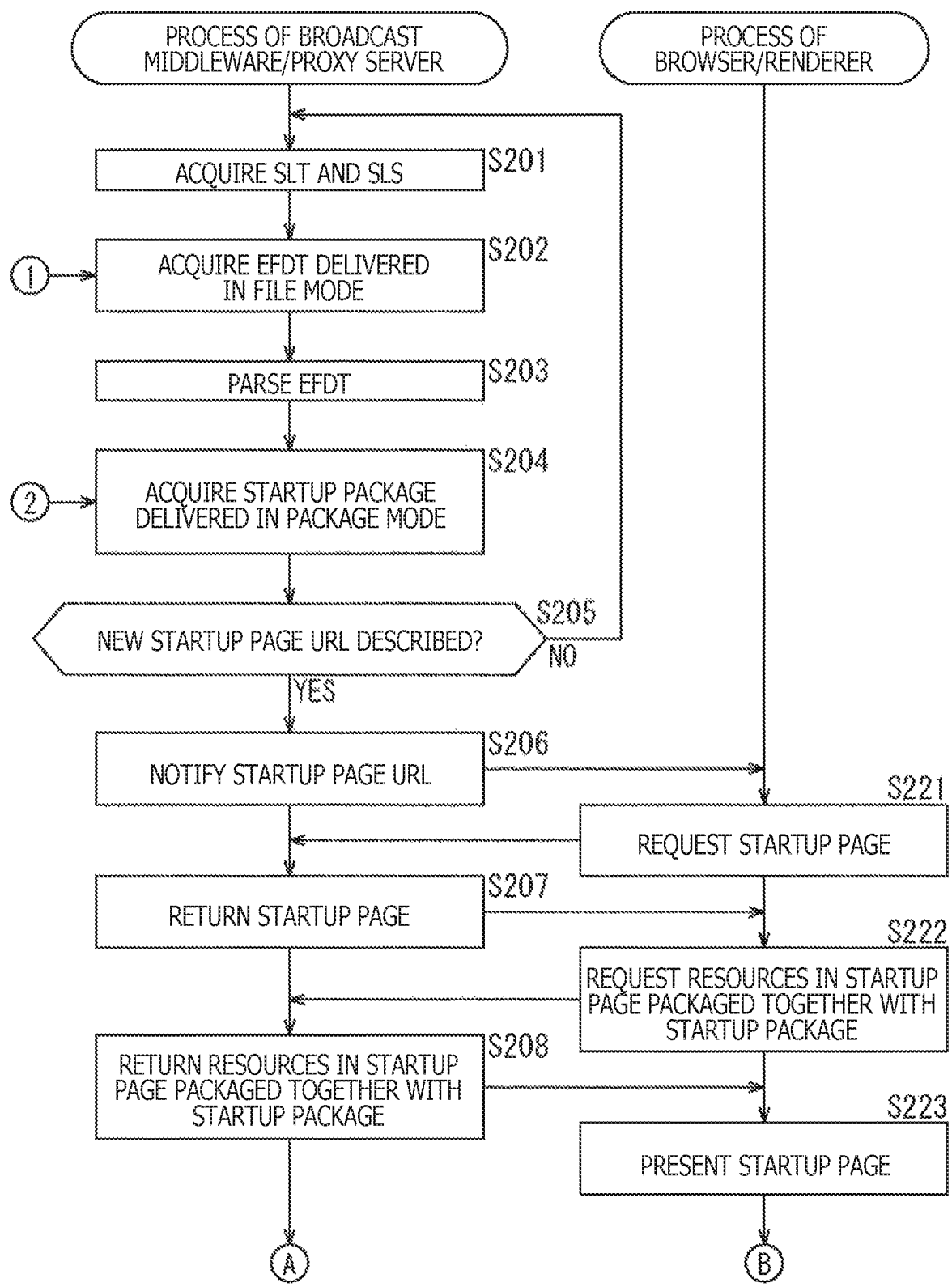
FIG. 17 is a flow chart describing a flow of processes on a reception side in the case where the broadcast mode is set.
Figure 21:
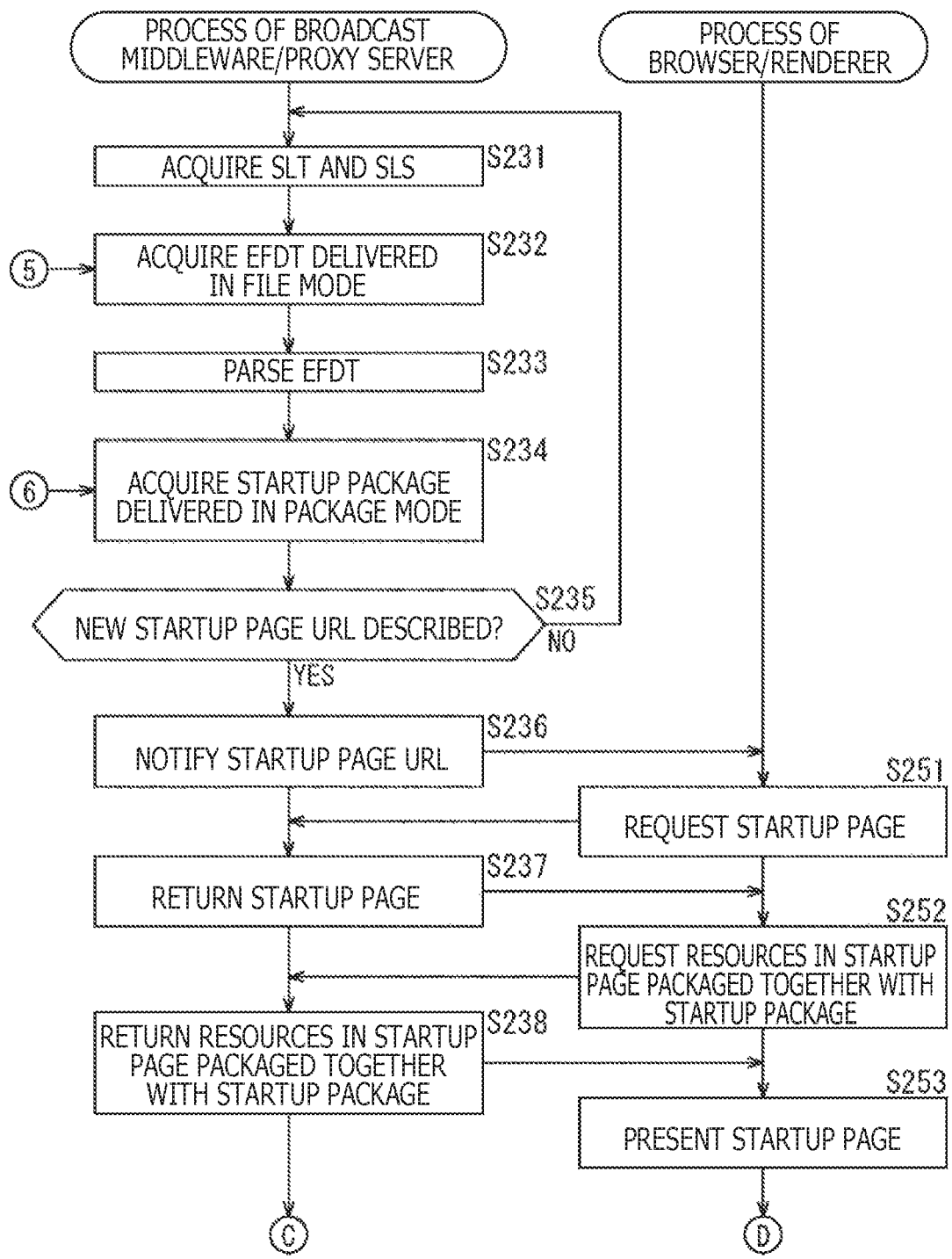
FIG. 21 is a flow chart describing a flow of processes on the reception side in the case where the hybrid mode is set.

In steps S231 to S238 of FIG. 21, the broadcast middleware 205 processes the EFDT and the startup package file delivered from the broadcast server 105 and notifies the browser 209 of the startup page URL in the case where a new startup page URL is described in the application manifest file of the startup package file as in steps S201 to S208 of FIG. 17. In addition, the proxy server 212 returns the startup page file and the resource files in the startup file in response to the request from the browser 209.

Furthermore, in steps S251 to S253 of FIG. 21, the browser 209 requests for the startup page file and the resource files in the startup file, and the renderer 213 presents the startup page according to the reply from the proxy server 212 as in steps S221 to S223 of FIG. 17.

Figure 18:
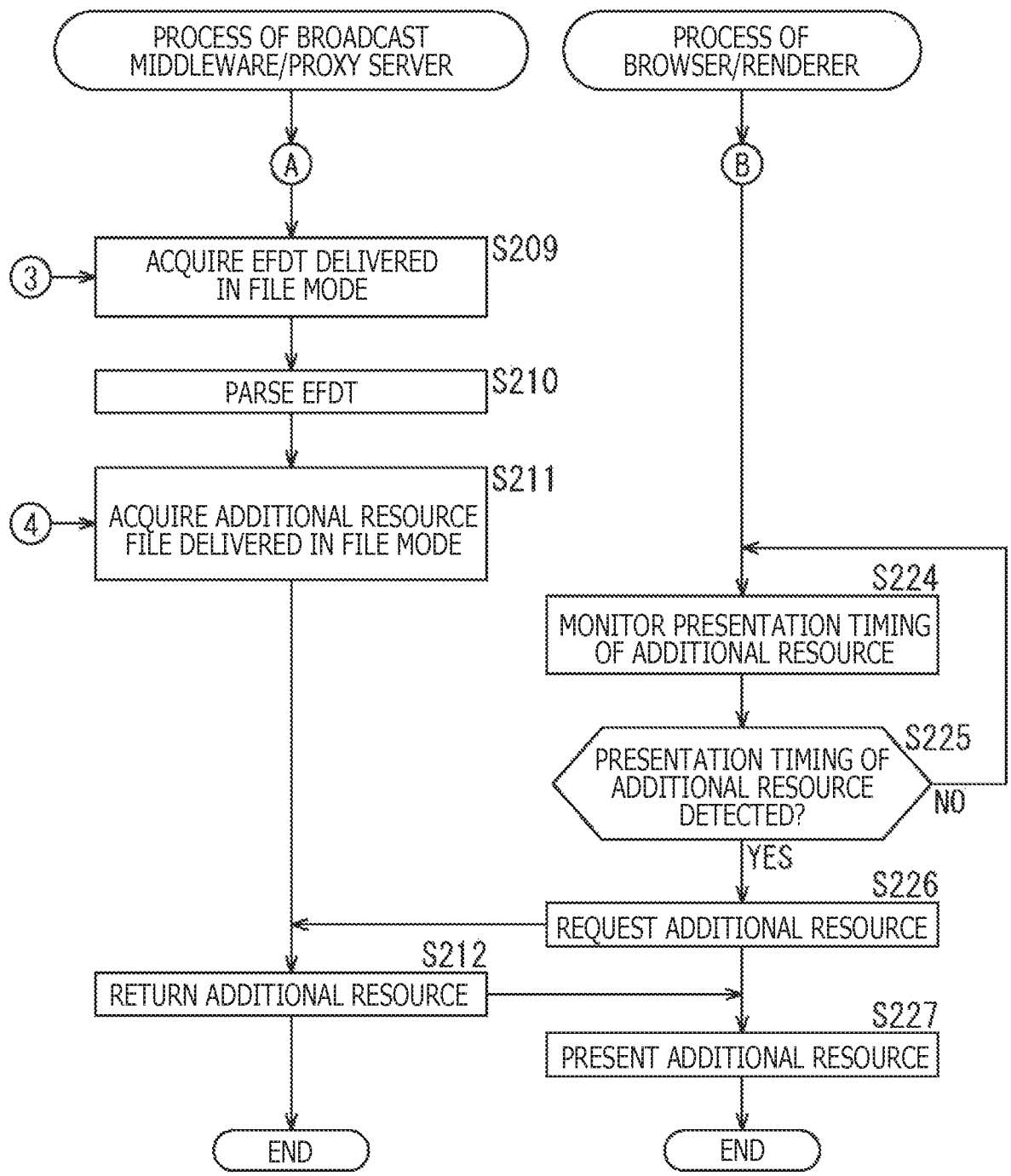
FIG. 18 is a flow chart describing a flow of processes on the reception side in the case where the broadcast mode is set.
Figure 22:
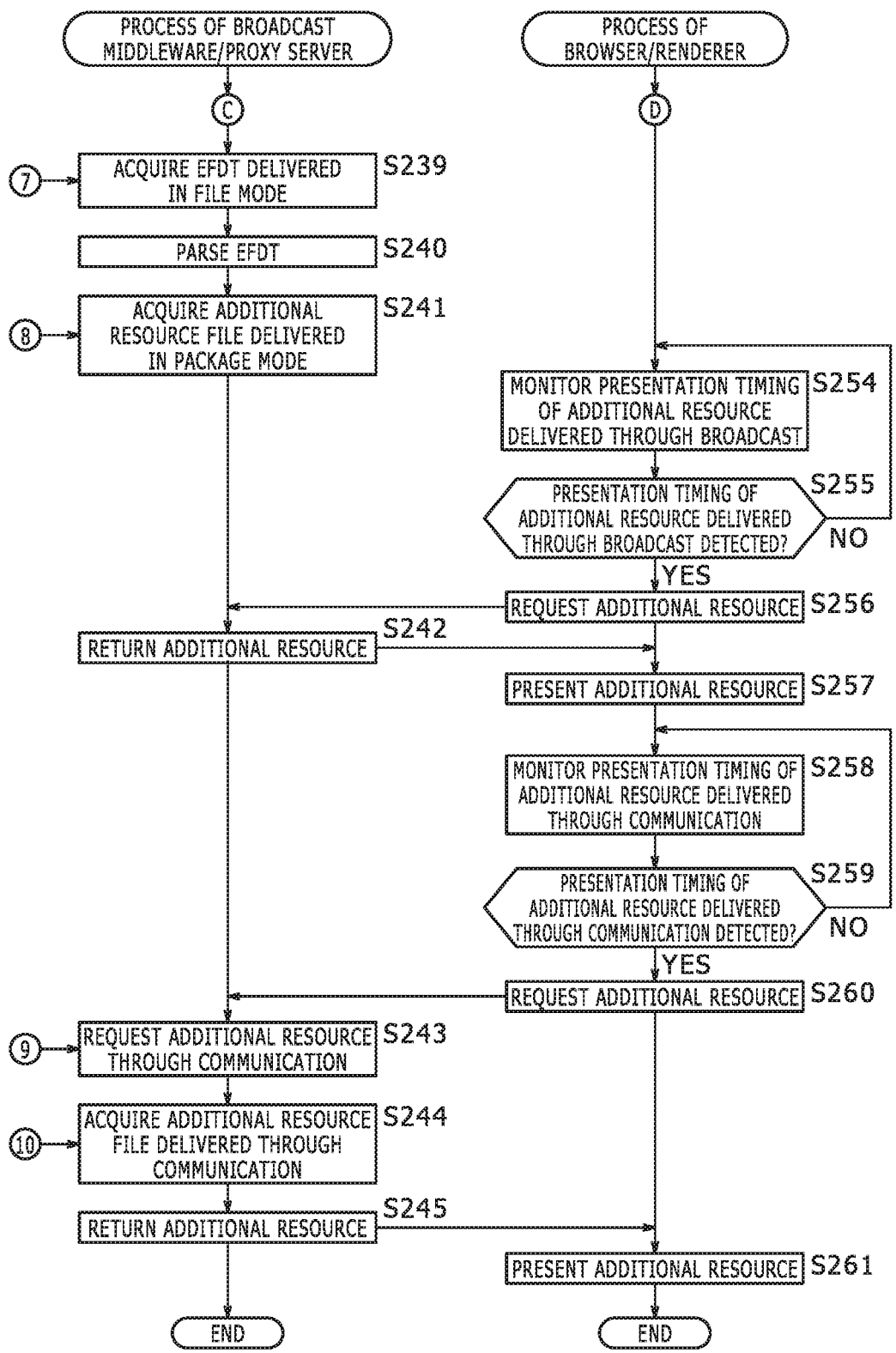
FIG. 22 is a flow chart describing a flow of processes on the reception side in the case where the hybrid mode is set.

In steps S239 to S242 of FIG. 22, the broadcast middleware 205 processes the EFDT and the additional resource file delivered from the broadcast server 105 as in steps S209 to 212 of FIG. 18. In addition, the proxy server 212 returns the additional resource file in response to the request from the browser 209.

Furthermore, in steps S254 to S257 of FIG. 22, the browser 209 monitors the presentation timing of the additional resource file delivered through broadcast and requests for the additional resource file at the presentation timing as in steps S224 to S227 of FIG. 18. In addition, the renderer 213 presents the additional resource file according to the reply from the proxy server 212.

In this way, the additional resource file delivered from the broadcast server 105 through broadcast is presented. Meanwhile, the additional resource file is processed as follows in the case where the additional resource file is delivered from the communication server 106 through communication.

That is, the browser 209 monitors the presentation timing of the additional resource file delivered through communication in step S258 of FIG. 22. In step S259, the browser 209 determines whether the presentation timing of the additional resource file delivered through communication is detected on the basis of the monitoring result of step S258.

If the browser 209 determines that the presentation timing of the additional resource file is not detected in step S259, the process returns to step S258, and the monitoring process of steps S258 and S259 is repeated. Then, if the browser 209 determines that the presentation timing of the additional resource file is detected in step S259, the process proceeds to step S260.

In step S260, the browser 209 requests the proxy server 212 for the additional resource file according to the detection result (detection result of presentation timing detection) of the process of step S259.

In step S243, the proxy server 212 requests the communication server 106 for the additional resource file through the Internet 90 in response to the request of the additional resource file from the browser 209. In step S244, the proxy server 212 acquires the additional resource file delivered from the communication server 106 through the Internet 90 according to the request in step S243.

In step S245, the proxy server 212 returns the additional resource file acquired in the process of step S244 to the browser 209. As a result, the browser 209 can acquire the additional resource file from the proxy server 212.

In step S261, the browser 209 controls the renderer 213 to present the additional resource file acquired from the proxy server 212. As a result, the information of the additional resource is added to the application (startup page of the application).

This completes the description of the flow of the processes on the reception side.

(C) Communication Mode

Lastly, the case where the communication mode is set as a delivery mode will be described with reference to FIGS. 23 to 26.

(Flow of Data in Communication Mode)

Figure 23:
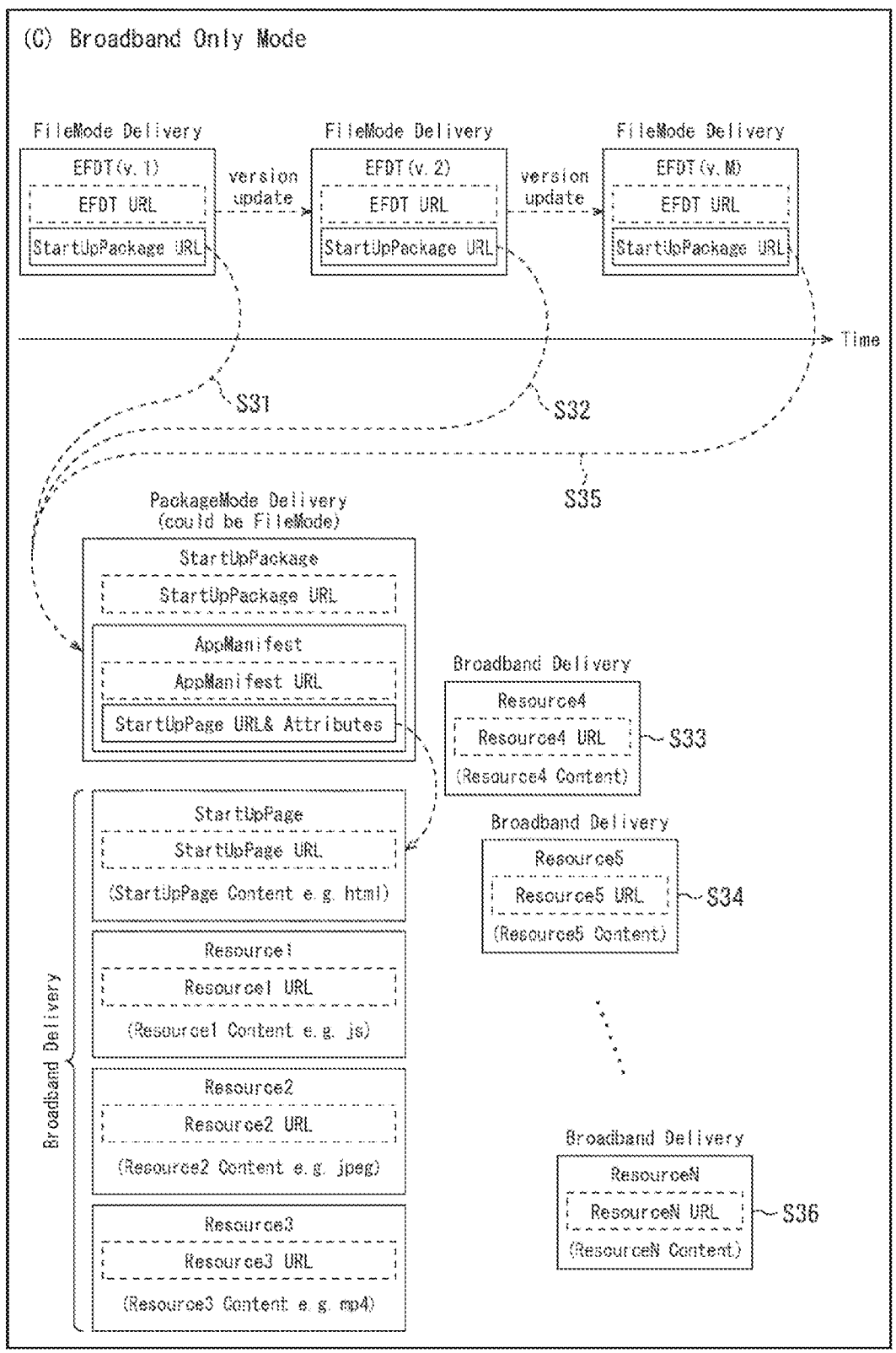
FIG. 23 is a diagram describing a flow of data related to the application processed when a communication mode is set.

FIG. 23 is a diagram describing a flow of data related to the application associated with the content processed by the client apparatus 20 (FIG. 1) when the communication mode is set. Note that the flow of the data related to the application of FIG. 23 corresponds to the display content (content of view) of the application presented according to each scene of the broadcast program illustrated in FIG. 14.

In FIG. 23, the client apparatus 20 acquires the startup package file delivered in the package mode according to the startup package URL of the EFDT (Ver1.0) (S31) as in S11 (broadcast mode) of FIG. 15 described above.

In the startup package file, the startup package URL for identifying the startup package file is described, and the application manifest file is included.

The startup page URL as well as the file URL of each resource file as delivery schedule information are described in the application manifest file. The client apparatus 20 can access the communication server 106 through the Internet 90 according to the URLs to acquire the startup page file (HTML document file) and the resource files (Resource1, Resource2, and Resource3) delivered through communication.

As a result, the startup page file (HTML document file) refers to the resource files (Resource1, Resource2, and Resource3), and the first view (FIG. 14) of the application is presented in the scene 1 (FIG. 14).

When the scene 1 shifts to scene 2, the content of the EFDT is changed, and the version is updated from Ver1.0 (v.1) to Ver2.0 (v.2). The EFDT of Ver2.0 is an EFDT delivered in the scene 2 (FIG. 14), and the startup package URL is described. That is, the resource files (Resource4 and Resource5) presented at the part of the previous stage and the part of the later stage of the scene 2 are delivered through communication in the communication mode, and the URLs of the resource files are not necessary in the EFDT of Ver2.0.

Then, the startup package file acquired according to the EFDT of Ver1.0 is referenced by the startup package URL of the EFDT of Ver2.0 (S32), and the resource files (Resource4 and Resource5) delivered through communication are acquired by the resource file URLs (S33 and S34).

Here, for example, the file URLs of the resource files (Resource4 and Resource 5) of the delivery schedule information of the application manifest file can be used as the resource file URLs of the respective resource files (Resource4 and Resource5) delivered through communication.

As a result, at the part of the previous stage of the scene 2 (FIG. 14), the startup page file is the same as the first startup page file, and the second view (FIG. 14) after the addition of the resource file (Resource4) delivered through communication is presented. In addition, at the part of the later stage of the scene 2 (FIG. 14), the startup page file is the same as the first startup page file, and the third view (FIG. 14) after the deletion of the resource file (Resource4) and the addition of the resource file (Resource5) delivered through communication are presented.

Furthermore, the version of the EFDT is sequentially updated from Ver2.0 (v.2) to Ver M (v.M) while the scene 2 shifts to the scene 3. The EFDT of Ver M is an EFDT delivered during the scene 3 (FIG. 14), and only the startup package URL is described.

Then, the startup package file acquired according to the EFDT of Ver1.0 is referenced by the startup package URL of the EFDT of Ver M (S35), and the resource file (Resource N) delivered through communication is acquired by the resource file URL (S36).

Here, for example, the file URL of each resource file of the delivery schedule information of the application manifest file can be used as the resource file URL of the resource file (Resource N) delivered through communication.

As a result, in the scene 3, the startup page file is the same as the first startup page file, and the Nth view (FIG. 14) after the addition of the resource file (Resource N) delivered through communication is presented.

Next, flows of processes executed by each apparatus of the transmission system 1 (FIG. 1) in the case where the communication mode is set will be described with reference to flow charts of FIGS. 24 to 26.

(Flow of Processes on Transmission Side)

First, a flow of processes on the transmission side executed by the transmission side system 10 in the case where the communication mode is set will be described with reference to the flow chart of FIG. 24.

Figure 24:
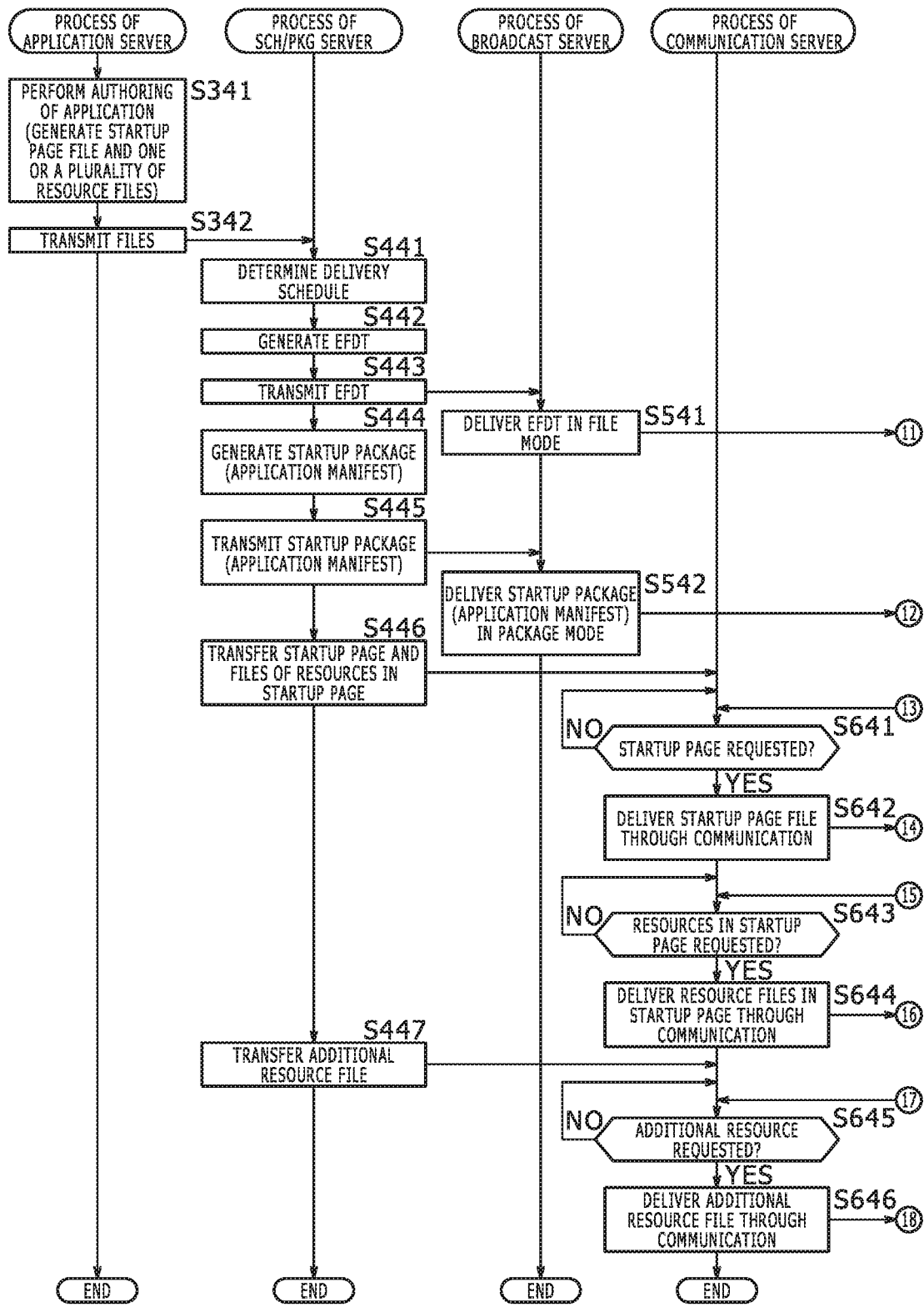
FIG. 24 is a flow chart describing a flow of processes on the transmission side in the case where the communication mode is set.

In steps S341 and S342 of FIG. 24, the application server (FIG. 1) executes the authoring process as in steps S301 and S302 of FIG. 16, and the file group configuring the application is generated.

In steps S421 to S427 of FIG. 24, although the SCH/PKG server 104 (FIG. 1) executes the process of determining the delivery schedule, generating the EFDT, and generating the startup package file as in steps S401 to S408 of FIG. 16, the difference is that the transfer destination of the startup page file, the resource files in the startup page file, and the additional resource file is the communication server 106 instead of the broadcast server 105.

In steps S541 and S542 of FIG. 24, the broadcast server 105 (FIG. 1) transmits (simultaneously broadcasts) the EFDT in the file mode and the startup package file in the package mode through the transmission path 80 as in steps S501 and S502 of FIG. 16.

The communication server 106 (FIG. 1) executes steps S641 to S646 of FIG. 24. In addition, the communication server 106 receives the startup page file and the resource files in the startup page file transferred in the process of step S446 and the additional resource file transferred in the process of step S447.

In steps S641 to S646 of FIG. 24, various files are delivered in response to a request from the client apparatus 20 through the Internet 90 as in steps S621 and S622 of FIG. 20.

In step S641, the communication server 106 determines whether the startup page file is requested from the client apparatus 20 through the Internet 90. If the communication server 106 determines that the startup page file is not requested in step S641, the determination process of step S641 is repeated.

On the other hand, if the communication server 106 determines that the startup page file is requested in step S641, the process proceeds to step S642. In step S642, the communication server 106 delivers the startup page file transferred in the process of step S446 (startup page file generated in the process of step S341) to the client apparatus 20 as a requester through the Internet 90.

In step S643, the communication server 106 determines whether the resource files in the startup page file are requested from the client apparatus 20 through the Internet 90. If the communication server 106 determines that the resource files in the startup page file are not requested in step S643, the determination process of step S643 is repeated.

On the other hand, if the communication server 106 determines that the resource files in the startup page file are requested in step S643, the process proceeds to step S644. In step S644, the communication server 106 delivers the resource files in the startup page file transferred in the process of step S446 (resource files generated in the process of step S341) to the client apparatus 20 as a requester through the Internet 90.

In step S645, the communication server 106 determines whether the additional resource file is requested from the client apparatus 20 through the Internet 90. If the communication server 106 determines that the additional resource file is not requested in step S645, the determination process of step S645 is repeated.

On the other hand, if the communication server 106 determines that the additional resource file is requested in step S645, the process proceeds to step S646. In step S646, the communication server 106 delivers the additional resource file transferred in the process of step S447 (resource file generated in the process of step S341) to the client apparatus 20 as a requester through the Internet 90.

This completes the description of the flow of processes on the transmission side.

(Flow of Processes on Reception Side)

Next, a flow of processes on the reception side executed by the client apparatus 20 in the case where the communication mode is set will be described with reference to the flow charts of FIGS. 25 and 26. Note that the execution of the processes on the reception side is based on the premise that the client apparatus 20 is reproducing the content of the broadcast program delivered from the broadcast server 105, the VOD program delivered from the communication server 106, or the like as in FIGS. 17 and 18 described above.

Figure 25:
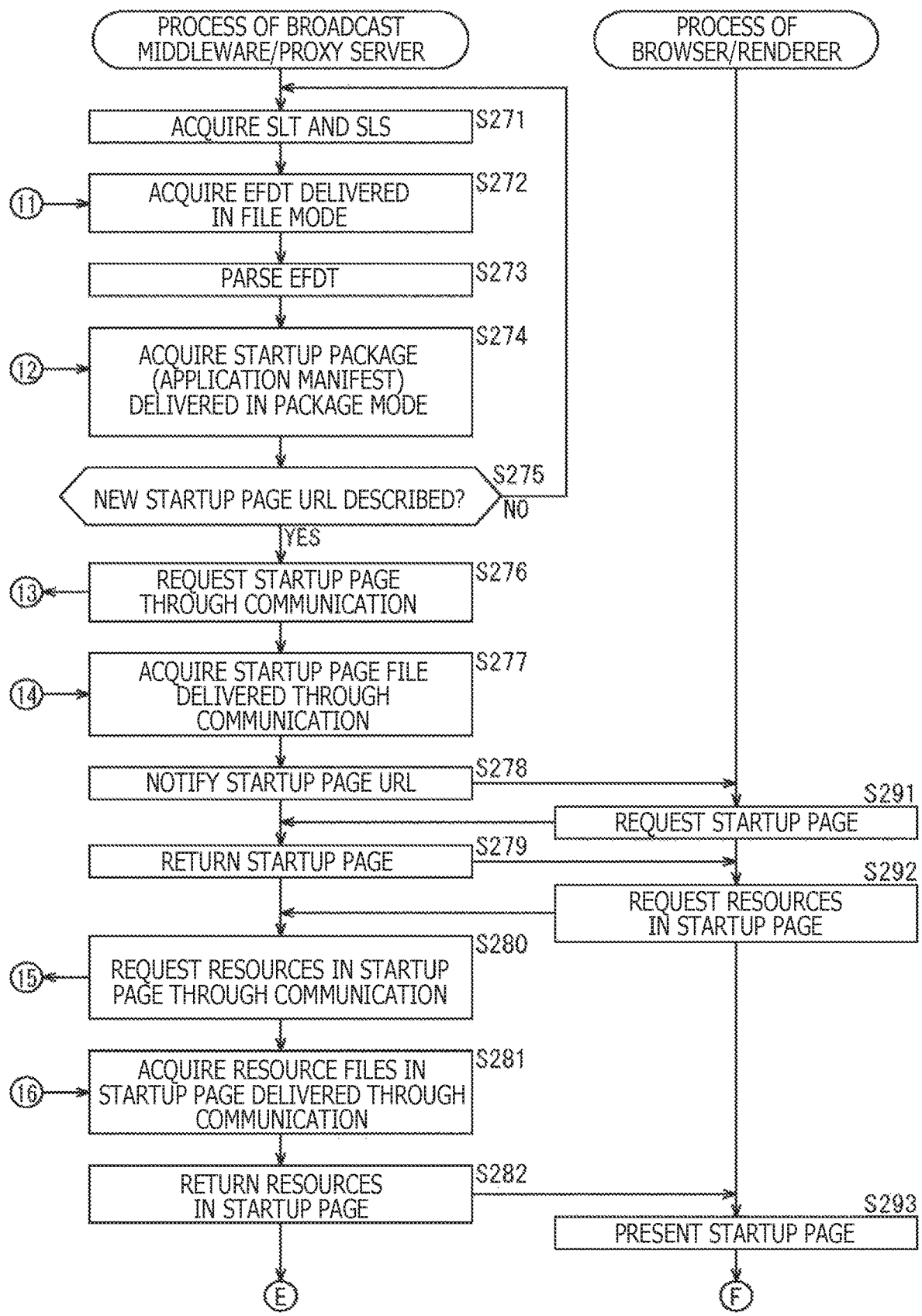
FIG. 25 is a flow chart describing a flow of processes on the reception side in the case where the communication mode is set.

In steps S271 to S275 of FIG. 25, the broadcast middleware 205 processes the EFDT and the startup package file delivered from the broadcast server 105 and determines whether a new startup page URL is described in the application manifest file of the startup package file (S275) as in steps S201 to S205 of FIG. 17.

In step S275, if the broadcast middleware 205 determines that a new startup page URL is described in the application manifest file, the process proceeds to step S276.

In step S276, the proxy server 212 requests the communication server 106 for the startup page file through the Internet 90 according to the determination result of step S275. In step S277, the proxy server 212 acquires the startup page file delivered from the communication server 106 through the Internet 90 according to the request in step S276.

In step S278, the proxy server 212 notifies the browser 209 of the startup page URL described in the application manifest file of the startup package file.

In step S291, the browser 209 requests the proxy server 212 for the startup page file according to the startup page URL notified in the process of step S278.

In step S279, the proxy server 212 returns the startup page file ready to be returned to the browser 209 in response to the request for the startup page file from the browser 209. As a result, the browser 209 can acquire the startup page file from the proxy server 212.

In step S292, the browser 209 requests the proxy server 212 for the resource files in the startup page file.

In step S280, the proxy server 212 requests the communication server 106 for the resource files in the startup page file through the Internet 90 in response to the request for the resource files in the startup page file from the browser 209. In step S281, the proxy server 212 acquires the resource files in the startup page file delivered from the communication server 106 through the Internet 90 according to the request in step S280.

In step S282, the proxy server 212 returns the resource files in the startup page file acquired in the process of step S281 to the browser 209.

In step S293, the browser 209 presents the startup page on the basis of the startup page file and the resource files in the startup page file acquired from the proxy server 212. As a result, the application is displayed along with the content of a broadcast program or the like.

Figure 26:
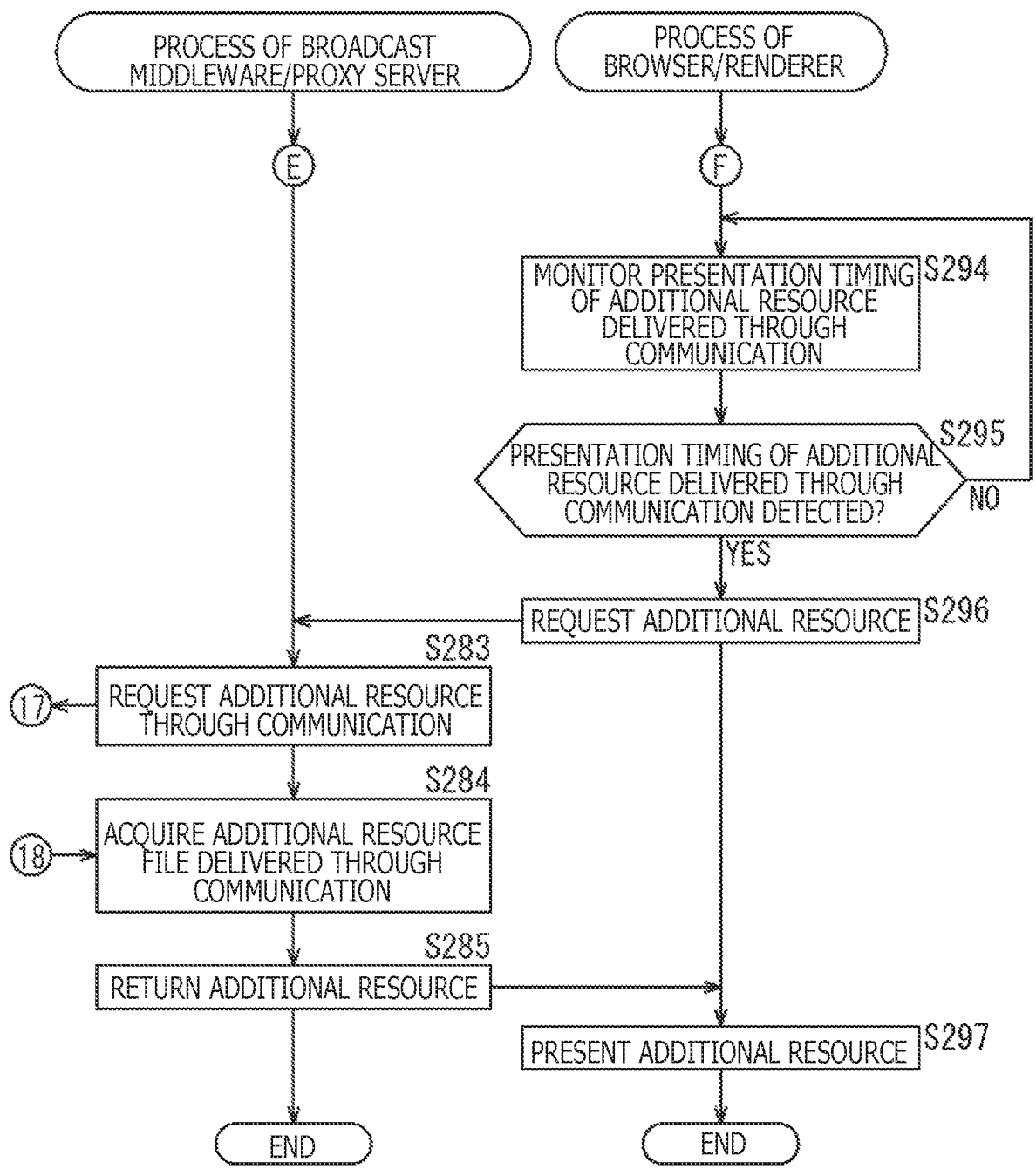
FIG. 26 is a flow chart describing a flow of processes on the reception side in the case where the communication mode is set.

In steps S294 to S296 of FIG. 26, the browser 209 monitors the presentation timing of the additional resource file delivered through communication and requests for the additional resource file at the presentation timing as in steps S258 to S260 of FIG. 22.

In steps S283 to S285 of FIG. 26, the proxy server 212 acquires the additional resource file from the communication server 106 through the Internet 90 and returns the additional resource file as in steps S243 to S245 of FIG. 22. In addition, in step S297 of FIG. 26, the renderer 213 presents the additional resource file according to the reply from the proxy server 212 as in step S261 of FIG. 22. As a result, the information of the additional resource is added to the application (startup page of application).

This completes the description of the flow of the processes on the reception side.

4. Examples of Signaling

Next, examples of formats of signaling will be described with reference to FIGS. 27 to 31.

(Format of USD)

FIG. 27 depicts an example of the format of USD metadata in the XML format. Note that in FIG. 27, "@" is provided to attributes among the elements and the attributes. In addition, indented elements and attributes are designated for elements above the indented elements and attributes. The relationships are also similar in the other formats of signaling described later.

A bundleDescription element is a root element and is an element above a userServiceDescription element (USD element). The userServiceDescription element is an element above a serviceId attribute, an atsc:serviceId attribute, an atsc:fullMPDUri attribute, an atsc:sTSIDUri attribute, a name element, a serviceLanguage element, an atsc:capabilityCode element, and a deliveryMethod element.

Service IDs are designated in the serviceId attribute and the atsc:serviceId attribute. A URI for reference to MPD metadata is designated in the atsc:fullMPDUri attribute. A URI for reference to S-TSID metadata is designated in the atsc:sTSIDUri attribute. Note that the details of the format of the S-TSID metadata will be described with reference to FIG. 28 described later.

The name of a service of ATSC 3.0 is designated in the name element. The name element is an element above a lang attribute. A language of the name of the service of ATSC 3.0 is designated in the lang attribute. Languages that can be used in the service of ATSC 3.0 is designated in the serviceLanguage element. A code related to a function is designated in the atsc:capabilityCode element.

Information regarding the delivery method of data is designated in the deliveryMethod element. The deliveryMethod element is an element above an atsc:broadcastAppService element and an atsc:unicastAppService element. The atsc:broadcastAppService element is an element above a basePattern element, and information regarding the delivery through broadcast is designated. The atsc:unicastAppService element is an element above a basePattern element, and information regarding the delivery through communication is designated.

(Format of S-TSID)

FIG. 28 depicts an example of the format of the S-TSID metadata in the XML format.

An S-TSID element is a root element and is an element above an RS element. Information regarding a ROUTE session is designated in the RS element. The RS element is an element above a bsid attribute, an sIpAddr attribute, a dIpAddr attribute, a dport attribute, a PLPID attribute, and an LS element.

A broadcast stream ID is designated in the bsid attribute. An IP address of the source is designated in the sIpAddr attribute. An IP address of the destination is designated in the dIpAddr attribute. A port number of the destination is designated in the dport attribute. An ID of a PLP of the ROUTE session is designated in the PLPID attribute.

Information regarding an LCT session is designated in the LS element. The LS element is an element above a tsi attribute, a PLPID attribute, a bw attribute, a startTime attribute, an endTime attribute, an SrcFlow element, and an RprFlow element.

A TSI is designated in the tsi attribute. An ID of the PLP is designated in the PLPID attribute. A bandwidth is designated in the bw attribute. Start date and time and end date and time are designated in the startTime attribute and the endTime attribute. Source flow information is designated in the SrcFlow element.

Here, FIG. 29 illustrates a format of the SrcFlow element included in the S-TSID metadata of FIG. 28.

The SrcFlow element of FIG. 29 is an element above an rt attribute, a minBuffSize attribute, an EFDT element, a ContentInfo element, and a Payload element.

A minimum buffer size required by the client apparatus 20 is designated in the minBuffSize attribute. Information regarding the extended FDT (Extended FDT) is designated in the EFDT element. Information regarding the content is designated in the ContentInfo element.

The Payload element is an element above a codePoint attribute, a formatID attribute, a frag attribute, an order attribute, an srcFecPayloadID attribute, and an FECParams attribute, and information regarding the payload of ROUTE packets storing objects of the source flow is designated.

Note that the value of the formatID attribute distinguishes the file mode (structure storing a single file) and the package mode (structure packaging a plurality of files). That is, the value of the codePoint attribute as an attribute of the Payload element is equal to CodePoint of the LCT packet header for dividing and carrying a file. The value of CodePoint can uniquely designate a set of values of the attributes of the Payload element (set of values of Payload@formatID, Payload@frag, Payload@order, and Payload@srcFecPayloadID).

That is, the value of the TSI (Transport Session Identifier) of the LCT packet is used to search for the description of the corresponding LCT channel (session) in the S-TSID (S-TSID/RS/LS@tsi) and to further search for the Payload attribute in which the value of SrcFlow/Payload@codePoint of the LS and the value of CodePoint of the LCT packet header match. Then, the value of the format ID attribute described as an attribute of the searched Payload attribute distinguishes whether the file carried by the LCT packet is in the file mode or in the package mode.

Here, FIG. 30 illustrates a format of the EFDT element included in the SrcFlow element of FIG. 29. The EFDT element of FIG. 30 is an element above a tsi attribute, an idRef attribute, a version attribute, a maxExpiresDelta attribute, a maxTransportSize attribute, a FileTemplate attribute, and an FDTParameters attribute.

The EFDT (file of the EFDT) and the file group described in the EFDT are transferred in the LCT channel (session) of the ROUTE protocol indicated by the value of the tsi attribute of the EFDT element. In the LCT channel (session) transferring the EFDT (file of the EFDT) and the file group referenced by the EFDT, TOI (Transport Object Identifier) =0 is assigned for the EFDT, while the TOIs of the other file group are described in the EFDT.

Here, the EFDT element has a structure illustrated in FIG. 30. The root element is called FDT-instance, and the EFDT is an FDT-instance type. The FDT-Instance includes a plurality of File elements, and transfer control attributes of each file are described. Examples of main transfer control attributes include Content-Location that is a file name and TOI that is an identifier in the transfer.

Figure 31:
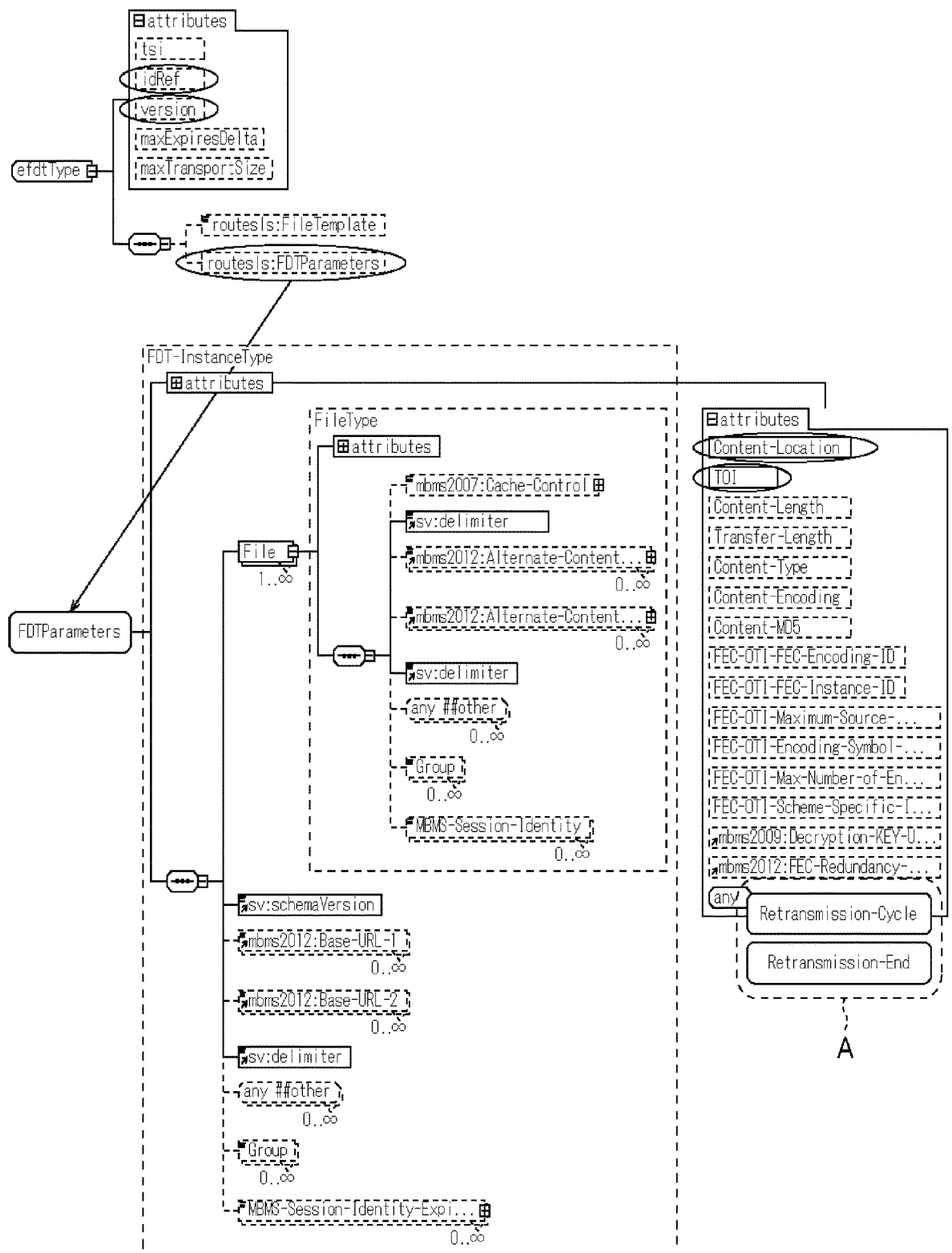
FIG. 31 depicts an example of an XML schema of the EFDT.

FIG. 31 illustrates an example of an XML schema of the EFDT. In FIG. 31, the attribute (FIG. 13) of the retransmission cycle (Retransmission-Cycle) of the resource file and the attribute (FIG. 13) of the retransmission end date and time (Retransmission-End) of the resource file are defined in a frame A.

5. Modifications

Although the ATSC (particularly, ATSC 3.0) that is a system adopted in the U.S.A. and the like is described above as a standard of digital broadcasting, the present technique may also be applied to ISDB (Integrated Services Digital Broadcasting) that is a system adopted in Japan and the like or DVB (Digital Video Broadcasting) that is a system adopted in respective countries in Europe and the like. In addition, although the IP transmission system is adopted in the ATSC 3.0 in the example described above, the system is not limited to the IP transmission system, and for example, other systems, such as MPEG2-TS (Transport Stream) system, may also be applied.

In addition, the standard of digital broadcasting may be applied to standards of terrestrial broadcasting as well as satellite broadcasting using Broadcasting Satellite (BS), Communication Satellite (CS), or the like, cable broadcasting, such as cable television (CATV), and the like.

In addition, the names of the signaling and the like are examples, and other names are used in some cases. However, the difference in the names is a formal difference, and substantial content of target signaling or the like is not different. For example, the AST (Application Signaling Table) is called an AIT (Application Information Table) or the like in some cases. Furthermore, in the case where the signaling is described by a markup language such as XML, the names of the elements and the attributes are examples, and other names may also be adopted. However, the difference in the names is a formal difference, and substantial content of the elements and the attributes is not different.

In addition, although the SLT metadata is described above as LLS signaling, the LLS signaling may include metadata, such as EAT (Emergency Alerting Table) and RRT (Region Rating Table). The EAT metadata includes information regarding emergency information that needs to be announced urgently. The RRT metadata includes information regarding rating.

Note that the application is not limited to the application developed by a markup language, such as HTML5, or a script language, such as JavaScript (registered trademark), and the application may be developed by, for example, a programming language, such as Java (registered trademark). In addition, the content can include videos, advertisements, and any content, such as, for example, electronic books, games, and music.

In addition, the present technique can also be applied to a predetermined standard (standard other than the standard of digital broadcasting) and the like defined to use, as a transmission path, a transmission path other than the broadcast network, that is, for example, a communication line (communication network), such as the Internet and a telephone network.

6. Configuration of Computer

Figure 32:
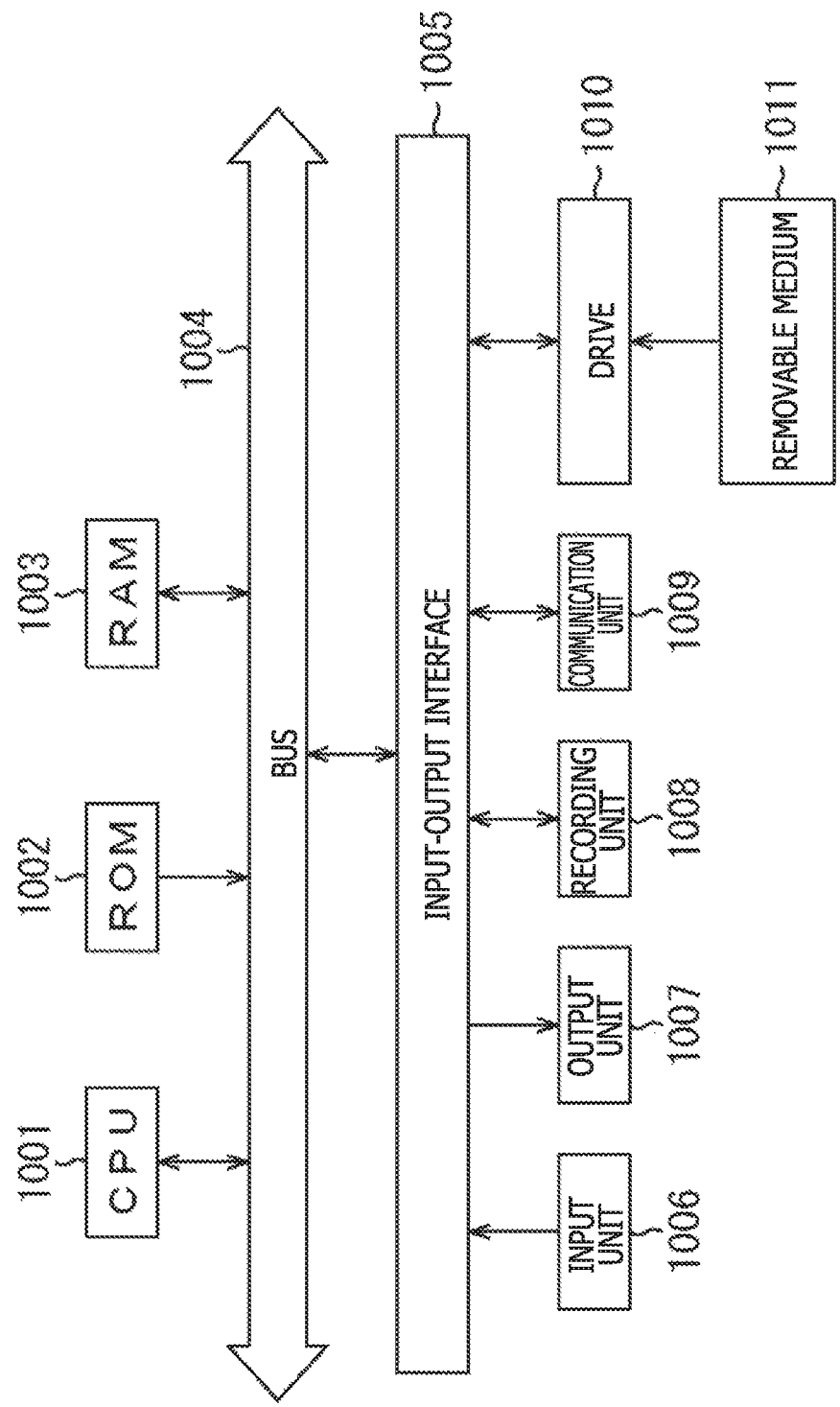
FIG. 32 depicts a configuration example of a computer.

The series of processes can also be executed by hardware or can be executed by software. In the case where the series of processes are executed by software, a program included in the software is installed on a computer. FIG. 32 depicts a configuration example of hardware of the computer using the program to execute the series of processes.

In a computer 1000, a CPU (Central Processing Unit) 1001, a ROM (Read Only Memory) 1002, and a RAM (Random Access Memory) 1003 are connected to each other by a bus 1004. An input-output interface 1005 is further connected to the bus 1004. An input unit 1006, an output unit 1007, a recording unit 1008, a communication unit 1009, and a drive 1010 are connected to the input-output interface 1005.

The input unit 1006 includes a keyboard, a mouse, a microphone, and the like. The output unit 1007 includes a display, a speaker, and the like. The recording unit 1008 includes a hard disk, a non-volatile memory, and the like. The communication unit 1009 includes a network interface and the like. The drive 1010 drives a removable medium 1011, such as a magnetic disk, an optical disk, a magneto-optical disk, and a semiconductor memory.

In the computer 1000 configured in this way, the CPU 1001 loads, on the RAM 1003, a program recorded in the ROM 1002 or the recording unit 1008 through the input-output interface 1005 and the bus 1004 and executes the program to execute the series of processes.

The program executed by the computer 1000 (CPU 1001) can be provided by, for example, recording the program in the removable medium 1011 as a package medium or the like. The program can also be provided through a wired or wireless transmission medium, such as a local area network, the Internet, and digital satellite broadcasting.

In the computer 1000, the removable medium 1011 can be mounted on the drive 1010 to install the program on the recording unit 1008 through the input-output interface 1005. The program can also be received by the communication unit 1009 through a wired or wireless transmission medium and installed on the recording unit 1008. Furthermore, the program can be installed in advance in the ROM 1002 or the recording unit 1008.

Here, in the present specification, the processes executed by the computer according to the program may not be executed in chronological order described in the flow charts. That is, the processes executed by the computer according to the program also include processes executed in parallel or individually (for example, parallel processing or processing based on objects). In addition, the program may be processed by one computer (processor), or a plurality of computers may execute distributed processing of the program.

Note that the embodiment of the present technique is not limited to the embodiment described above, and various changes can be made without departing from the scope of the present technique.

In addition, the present technique can be configured as follows.

(1)

A reception apparatus including:

a reception unit configured to receive content;

an acquisition unit configured to acquire resource delivery information regarding delivery of one or a plurality of resource files that are part of an application associated with the content, the resource delivery information transmitted along with the content; and a processing unit configured to execute a process according to the delivery of the resource files on a basis of the acquired resource delivery information.

(2)

The reception apparatus according to (1), in which the resource delivery information includes delivery schedule information regarding a delivery schedule of each of the resource files.

(3)

The reception apparatus according to (2), in which the delivery schedule information includes information indicating an acquisition location of each of the resource files and information regarding at least one of a size and delivery time of each of the resource files.

(4)

The reception apparatus according to (2), in which the resource delivery information includes transfer control information regarding delivery of a specific resource file with a delivery schedule that has possibilities to be changed according to a time zone.

(5)

The reception apparatus according to (4), in which the transfer control information includes information regarding at least one of a retransmission cycle and retransmission end time of the specific resource file.

(6)

The reception apparatus according to (4) or (5), in which video and audio data of the content is transmitted in a ROUTE (Real-time Object Delivery over Unidirectional Transport) session that is a protocol for transferring a streaming file, the delivery schedule information is included in an application manifest file packaged together with a startup package file transmitted in the ROUTE session, and the transfer control information is included in an EFDT (Extended FDT) transmitted in the ROUTE session, the EFDT specified by S-TSID (Service-based Transport Session Instance Description) that is control information of a ROUTE protocol.

(7)

A data processing method of a reception apparatus executed by the reception apparatus, the data processing method including:

acquiring resource delivery information regarding delivery of one or a plurality of resource files that are part of an application associated with content, the resource delivery information transmitted along with the content; and executing a process according to the delivery of the resource files on a basis of the acquired resource delivery information.

(8)

The data processing method according to (7), in which the resource delivery information includes delivery schedule information regarding a delivery schedule of each of the resource files.

(9)

The data processing method according to (8), in which the delivery schedule information includes information indicating an acquisition location of each of the resource files and information regarding at least one of a size and delivery time of each of the resource files.

(10)

The data processing method according to (8), in which the resource delivery information includes transfer control information regarding delivery of a specific resource file with a delivery schedule that has possibilities to be changed according to a time zone.

(11)

The data processing method according to (10), in which the transfer control information includes information regarding at least one of a retransmission cycle and retransmission end time of the specific resource file.

(12)

The data processing method according to (10) or (11), in which video and audio data of the content is transmitted in a ROUTE session that is a protocol for transferring a streaming file, the delivery schedule information is included in an application manifest file packaged together with a startup package file transmitted in the ROUTE session, and the transfer control information is included in an EFDT transmitted in the ROUTE session, the EFDT specified by S-TSID that is control information of a ROUTE protocol.

(13)

A transmission apparatus including:

a generation unit configured to generate resource delivery information regarding delivery of one or a plurality of resource files that are part of an application associated with content; and a transmission unit configured to transmit the resource delivery information along with the content.

(14)

The transmission apparatus according to (13), in which the resource delivery information includes delivery schedule information regarding a delivery schedule of each of the resource files.

(15)

The transmission apparatus according to (14), in which the delivery schedule information includes information indicating an acquisition location of each of the resource files and information regarding at least one of a size and delivery time of each of the resource files.

(16)

The transmission apparatus according to (14), in which the resource delivery information includes transfer control information regarding delivery of a specific resource file with a delivery schedule that has possibilities to be changed according to a time zone.

(17)

The transmission apparatus according to (16), in which the transfer control information includes information regarding at least one of a retransmission cycle and retransmission end time of the specific resource file.

(18)

The transmission apparatus according to (16) or (17), in which video and audio data of the content is transmitted in a ROUTE session that is a protocol for transferring a streaming file, the delivery schedule information is included in an application manifest file packaged together with a startup package file transmitted in the ROUTE session, and the transfer control information is included in an EFDT transmitted in the ROUTE session, the EFDT specified by S-TSID that is control information of a ROUTE protocol.

(19)

A data processing method of a transmission apparatus executed by the transmission apparatus, the data processing method including:

generating resource delivery information regarding delivery of one or a plurality of resource files that are part of an application associated with content; and transmitting the resource delivery information along with the content.

REFERENCE SIGNS LIST

1: Transmission system, 10: Transmission side system, 20: Client apparatus, 80: Transmission path, 90: Internet, 101: DASH server, 102: Signaling server, 103: Application server, 104: SCH/PKG server, 105: Broadcast server, 106: Communication server, 201: Processing unit 201, 202: Input unit, 203: Memory, 204: Reception unit, 205: Broadcast middleware, 206: DASH client, 207: Decoder, 208: Output unit, 209: Browser, 210: Communication unit, 211: Control unit, 212: Proxy server, 213: Renderer, 1000: Computer, 1001: CPU

The invention claimed is:

1. A reception apparatus comprising:
processing circuitry configured to
receive content;
acquire resource delivery information regarding delivery of one or more resource files that are related to an application associated with the content, wherein the resource delivery information includes a location of each resource file of the one or more resource files that are related to the application associated with the content; and
execute a process according to the delivery of the resource files on a basis of the acquired resource delivery information, wherein
video and audio data of the content is transmitted in a Real-time Object Delivery over Unidirectional Transport (ROUTE) session that is a protocol for transferring a streaming file, and
the resource delivery information is included in an Extended File Delivery Table (EFDT) transmitted in the ROUTE session, the EFDT specified by Service-based Transport Session Instance Description (S-TSID) that is control information of a ROUTE protocol.

2. The reception apparatus according to claim 1, wherein the resource delivery information includes delivery schedule information regarding a delivery schedule of each of the resource files.

3. The reception apparatus according to claim 2, wherein the delivery schedule information includes information regarding at least one of a size and delivery time of each of the resource files.

4. The reception apparatus according to claim 1, wherein the resource delivery information includes transfer control information regarding delivery of a specific resource file with a delivery schedule that has possibilities to be changed according to a time zone.

5. The reception apparatus according to claim 4, wherein the transfer control information includes information regarding at least one of a retransmission cycle and retransmission end time of the specific resource file.

6. The reception apparatus according to claim 2, wherein the delivery schedule information is included in an application manifest file packaged together with a startup package file transmitted in the ROUTE session.

7. A data processing method of a reception apparatus executed by the reception apparatus, the data processing method comprising:
acquiring resource delivery information regarding delivery of one or more resource files that are related to an application associated with content, wherein the resource delivery information includes a location of each resource file of the one or more resource files that are related to an application associated with the content; and
executing a process according to the delivery of the resource files on a basis of the acquired resource delivery information, wherein
video and audio data of the content is transmitted in a Real-time Object Delivery over Unidirectional Transport (ROUTE) session that is a protocol for transferring a streaming file, and
the resource delivery information is included in an Extended File Delivery Table (EFDT) transmitted in the ROUTE session, the EFDT specified by Service-based Transport Session Instance Description (S-TSID) that is control information of a ROUTE protocol.

8. The data processing method according to claim 7, wherein
the resource delivery information includes delivery schedule information regarding a delivery schedule of each of the resource files.

9. The data processing method according to claim 8, wherein
the delivery schedule information includes information regarding at least one of a size and delivery time of each of the resource files.

10. The data processing method according to claim 7, wherein
the resource delivery information includes transfer control information regarding delivery of a specific resource file with a delivery schedule that has possibilities to be changed according to a time zone.

11. The data processing method according to claim 10, wherein
the transfer control information includes information regarding at least one of a retransmission cycle and retransmission end time of the specific resource file.

12. The data processing method according to claim 8, wherein
the delivery schedule information is included in an application manifest file packaged together with a startup package file transmitted in the ROUTE (Real-time Object Delivery over Unidirectional Transport) session.

13. A transmission apparatus comprising:
processing circuitry configured to
generate resource delivery information regarding delivery of one or more resource files that are related to an application associated with content, wherein the resource delivery information includes a location of each resource file of the one or more resource files that are related to the application associated with the content; and
transmit the resource delivery information, wherein
video and audio data of the content is transmitted in a Real-time Object Delivery over Unidirectional Transport (ROUTE) session that is a protocol for transferring a streaming file, and
the resource delivery information is transmitted in an Extended File Delivery Table (EFDT) transmitted in the ROUTE session, the EFDT specified by Service-based Transport Session Instance Description (S-TSID) that is control information of a ROUTE protocol.

14. The transmission apparatus according to claim 13, wherein
the resource delivery information includes delivery schedule information regarding a delivery schedule of each of the resource files.

15. The transmission apparatus according to claim 14, wherein
the delivery schedule information includes information regarding at least one of a size and delivery time of each of the resource files.

16. The transmission apparatus according to claim 13, wherein
the resource delivery information includes transfer control information regarding delivery of a specific resource file with a delivery schedule that has possibilities to be changed according to a time zone.

17. The transmission apparatus according to claim 16, wherein
the transfer control information includes information regarding at least one of a retransmission cycle and retransmission end time of the specific resource file.

18. The transmission apparatus according to claim 14, wherein
the delivery schedule information is included in an application manifest file packaged together with a startup package file transmitted in the ROUTE session.

19. A data processing method of a transmission apparatus executed by the transmission apparatus, the data processing method comprising:
generating resource delivery information regarding delivery of one or more resource files that are related to an application associated with content, wherein the resource delivery information includes a location of each resource file of the one or more resource files that are related to the application associated with the content; and
transmitting the resource delivery information, wherein
video and audio data of the content is transmitted in a Real-time Object Delivery over Unidirectional Transport (ROUTE) session that is a protocol for transferring a streaming file, and
the resource delivery infoiination is transmitted in an Extended File Delivery Table (EFDT) transmitted in the ROUTE session, the EFDT specified by Service-based Transport Session Instance Description (S-TSID) that is control information of a ROUTE protocol.

20. The reception apparatus according to claim 1, wherein the processing circuitry is further configured to acquire the resource delivery information transmitted along with the content through a network.

* * * * *